March 10, 1936. C. W. SIMPSON ET AL 2,033,490
MULTIPLE SPINDLE AUTOMATIC SCREW MACHINE
Filed Sept. 10, 1932 21 Sheets-Sheet 7
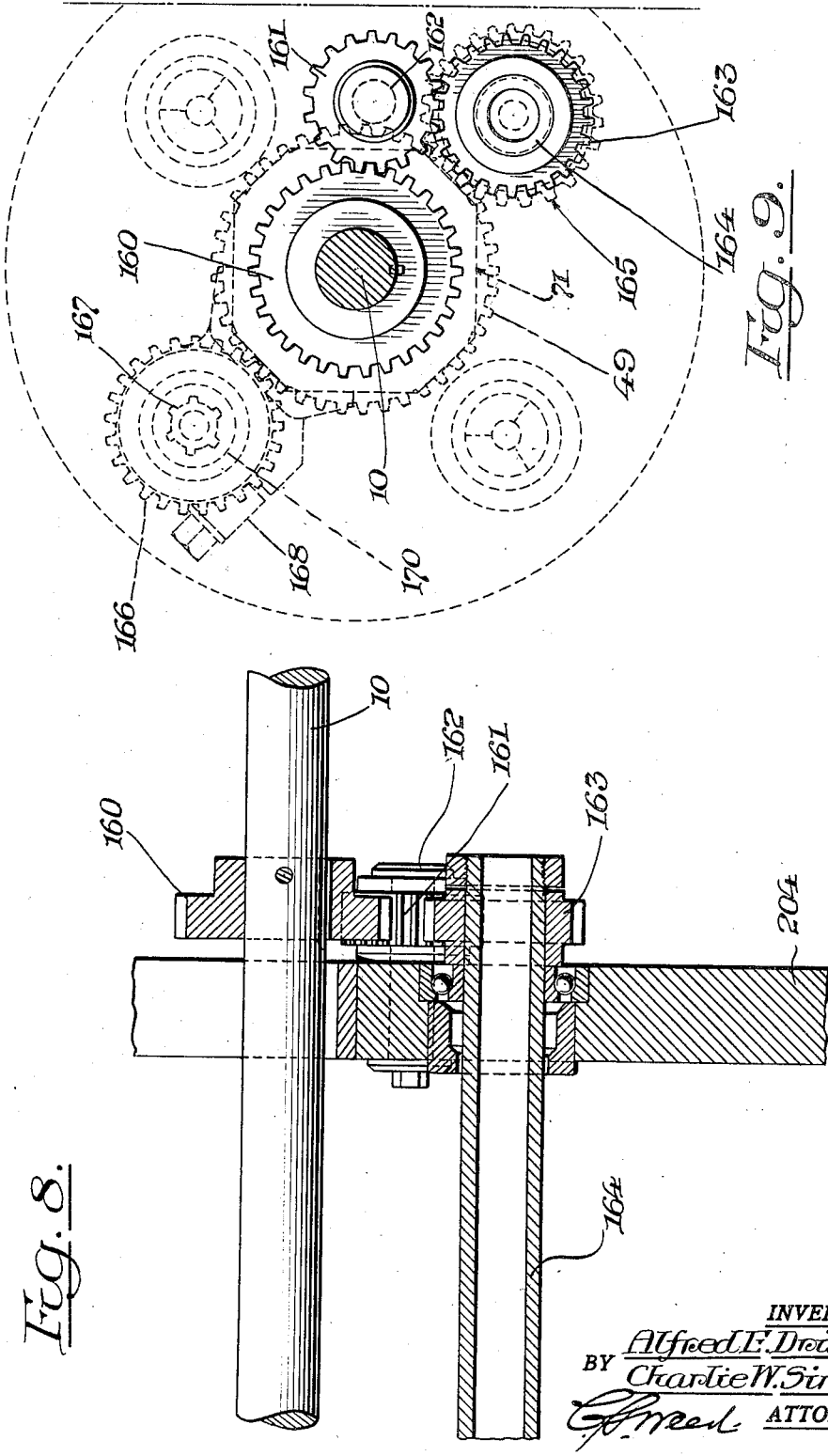
INVENTORS,
Alfred E. Dreissner
BY Charlie W. Simpson
ATTORNEY

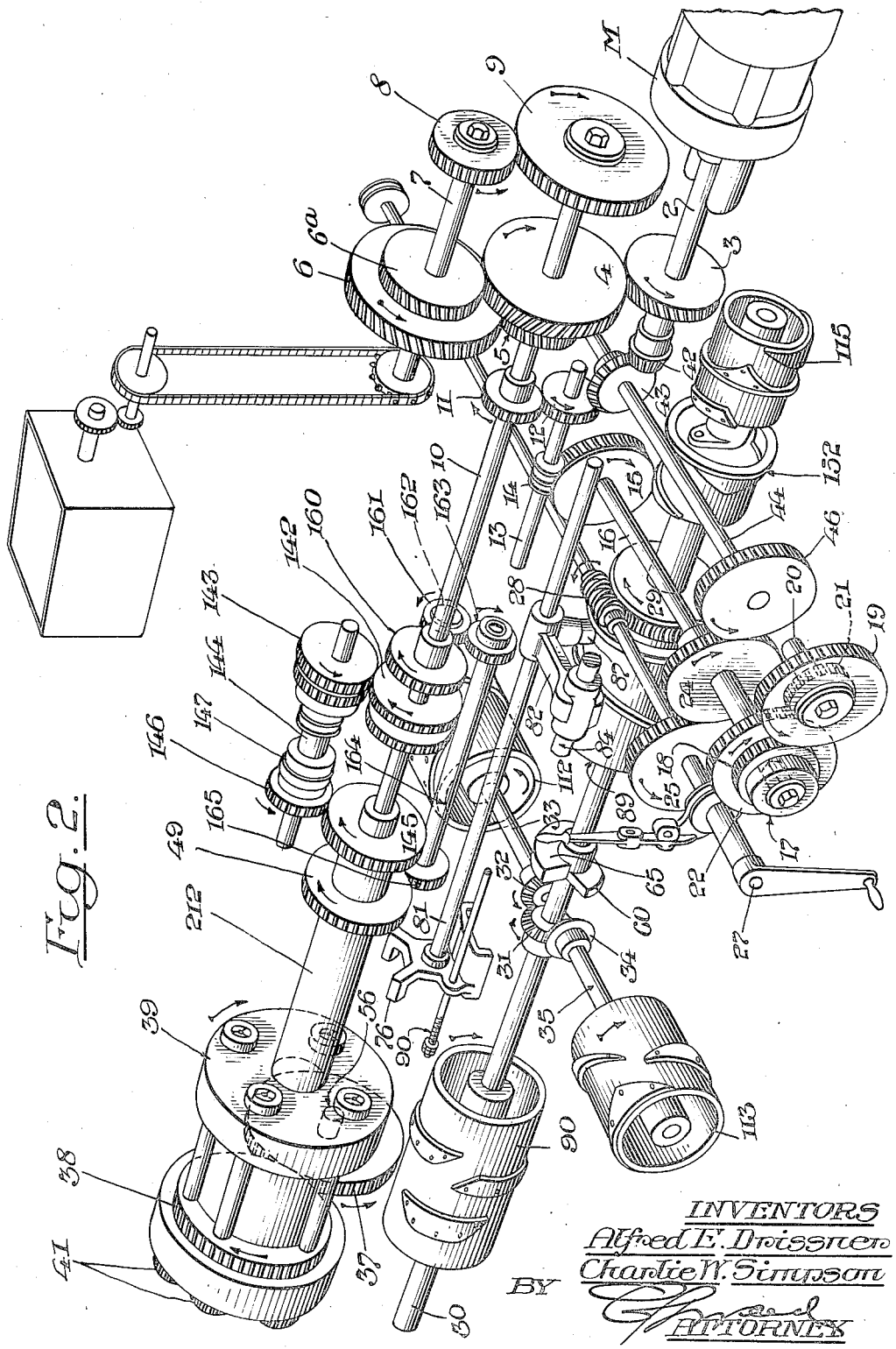

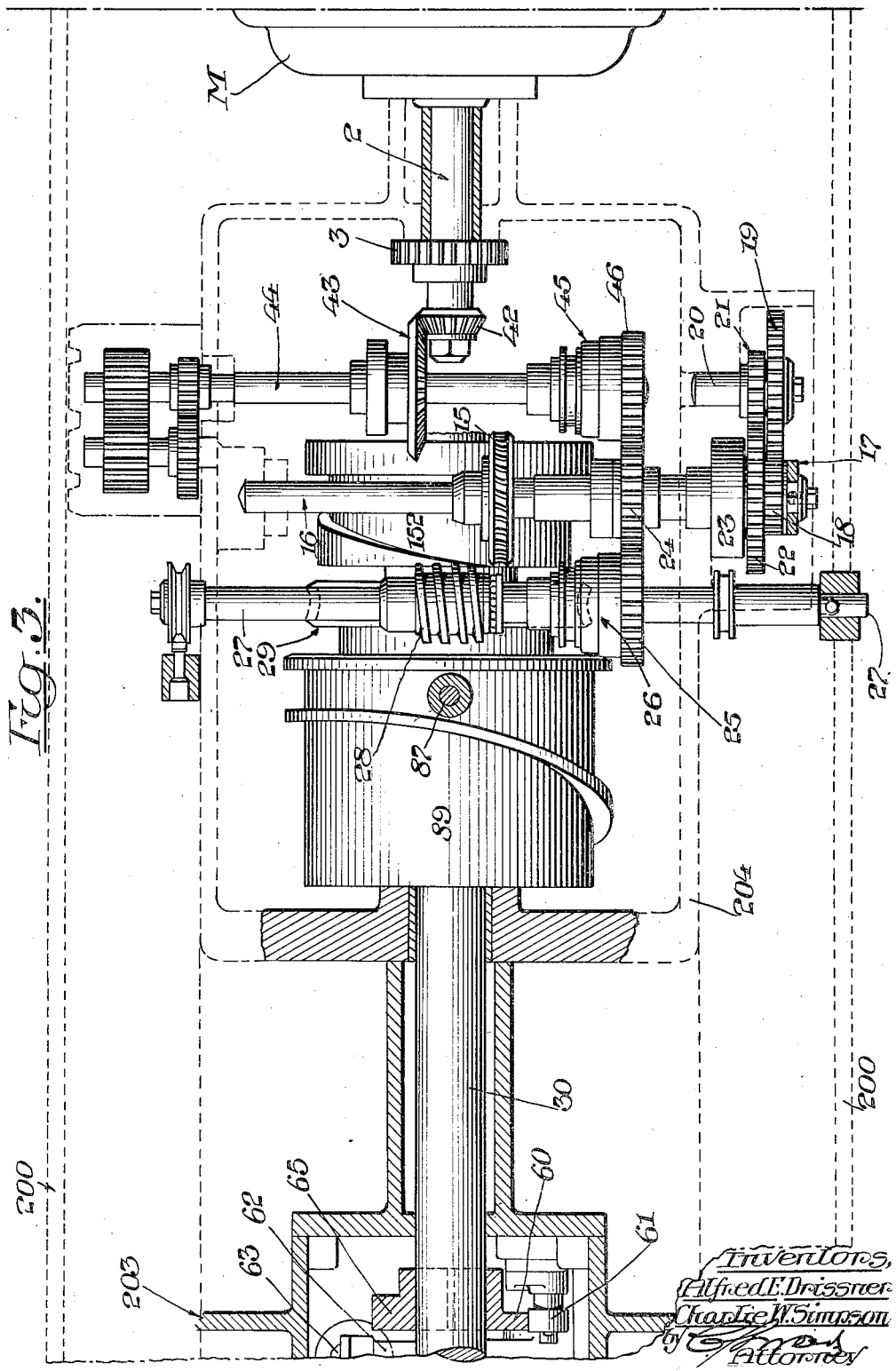

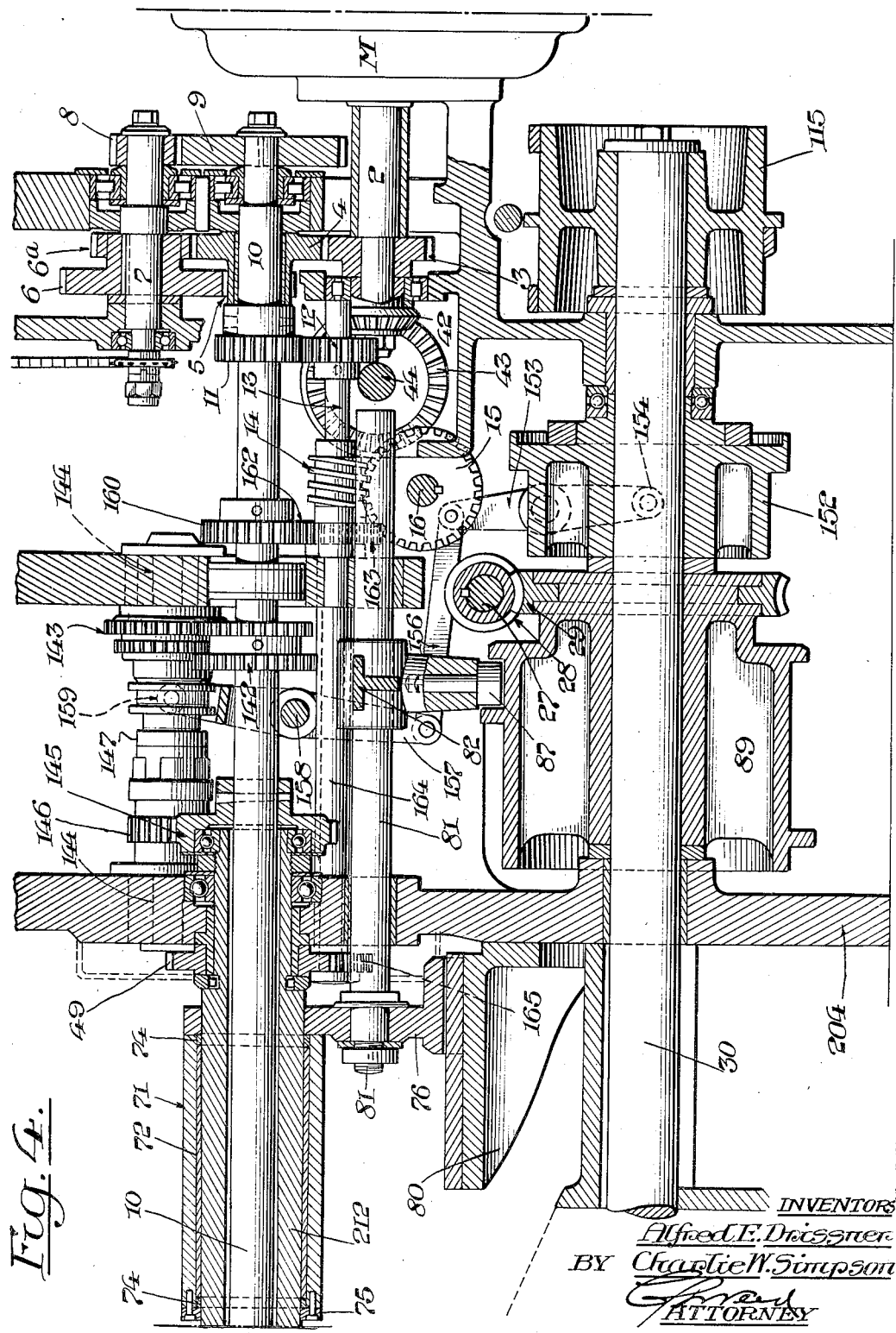

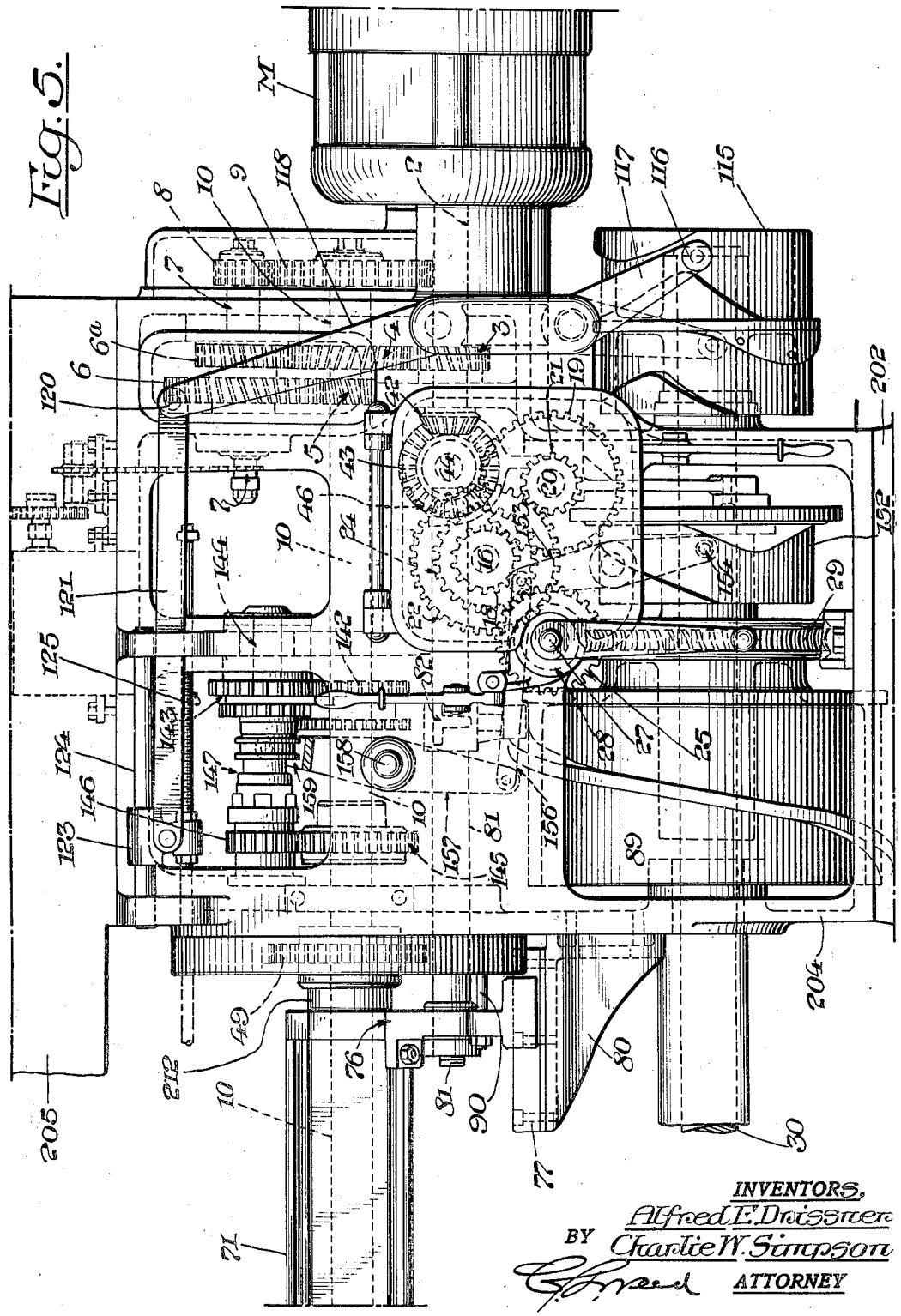

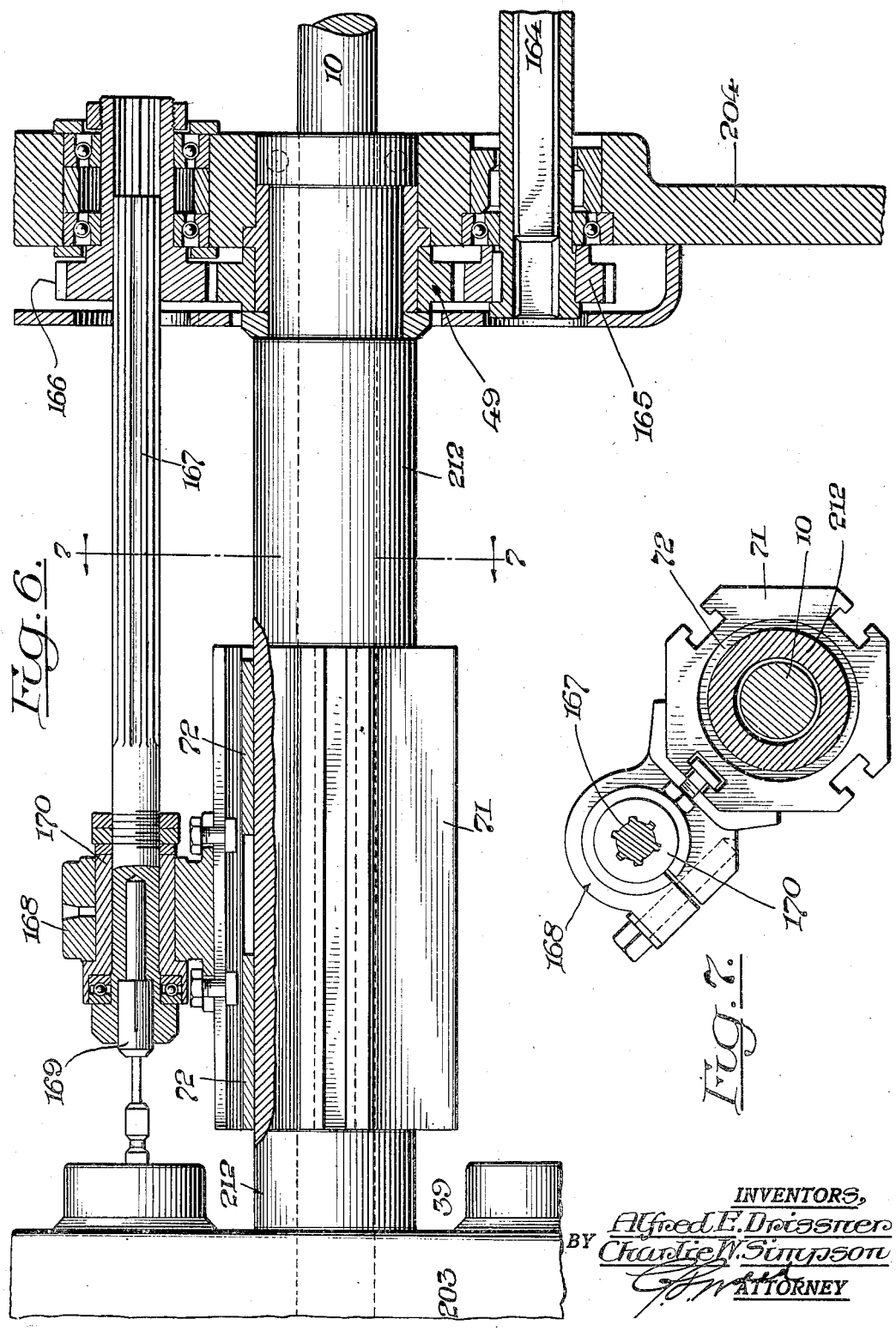

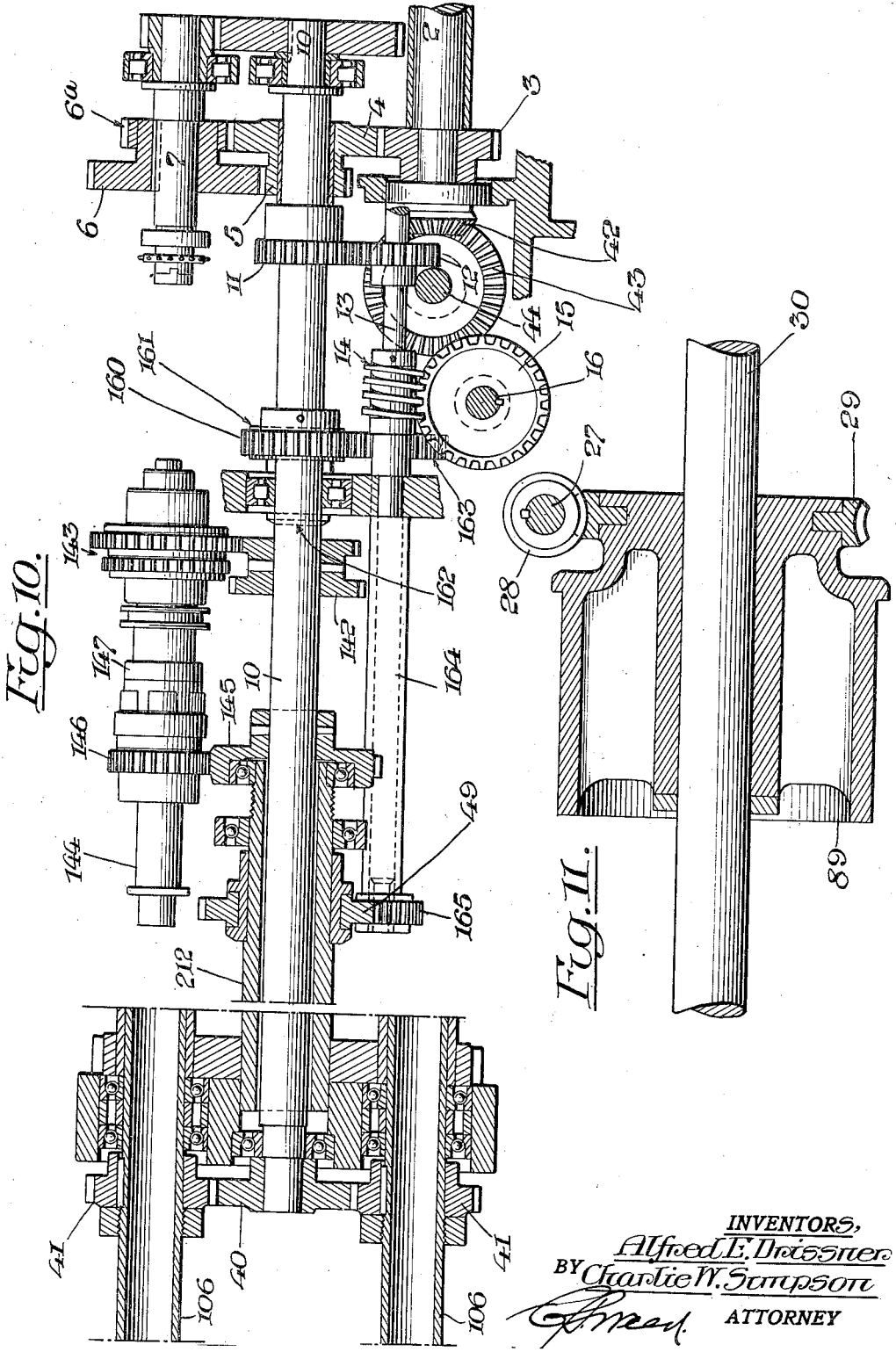

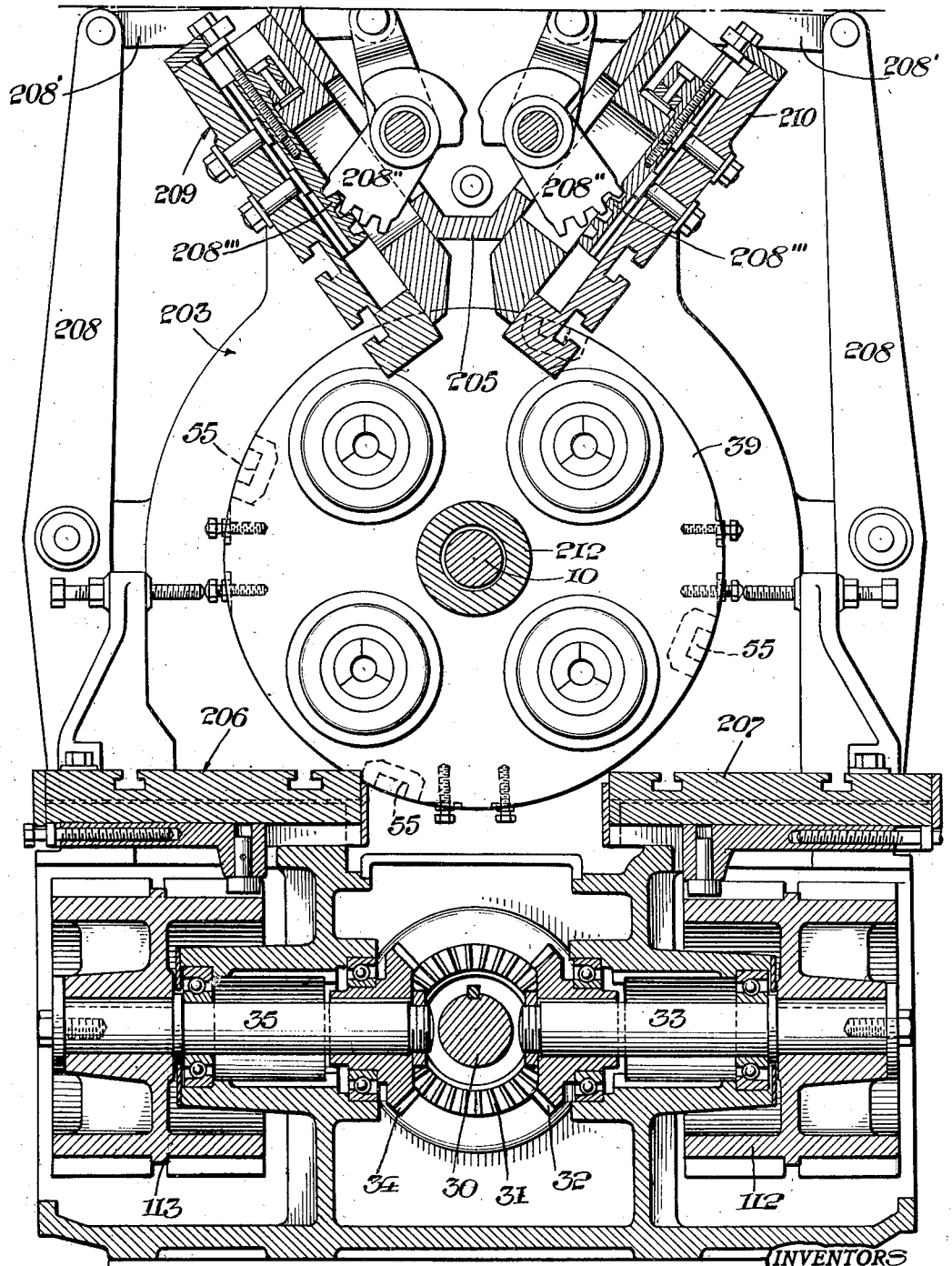

March 10, 1936.  C. W. SIMPSON ET AL  2,033,490
MULTIPLE SPINDLE AUTOMATIC SCREW MACHINE
Filed Sept. 10, 1932  21 Sheets-Sheet 10

INVENTORS
Alfred E. Drissner
Charlie W. Simpson
BY
ATTORNEY

March 10, 1936. C. W. SIMPSON ET AL 2,033,490
MULTIPLE SPINDLE AUTOMATIC SCREW MACHINE
Filed Sept. 10, 1932 21 Sheets-Sheet 13

Fig. IV.

INVENTORS,
Alfred E. Drissner
Charlie W. Simpson
BY
ATTORNEY

March 10, 1936. C. W. SIMPSON ET AL 2,033,490
MULTIPLE SPINDLE AUTOMATIC SCREW MACHINE
Filed Sept. 10, 1932 21 Sheets-Sheet 14

INVENTORS,
Alfred E. Drissner
Charlie W. Simpson
BY
ATTORNEY

March 10, 1936.    C. W. SIMPSON ET AL    2,033,490
MULTIPLE SPINDLE AUTOMATIC SCREW MACHINE
Filed Sept. 10, 1932    21 Sheets-Sheet 15
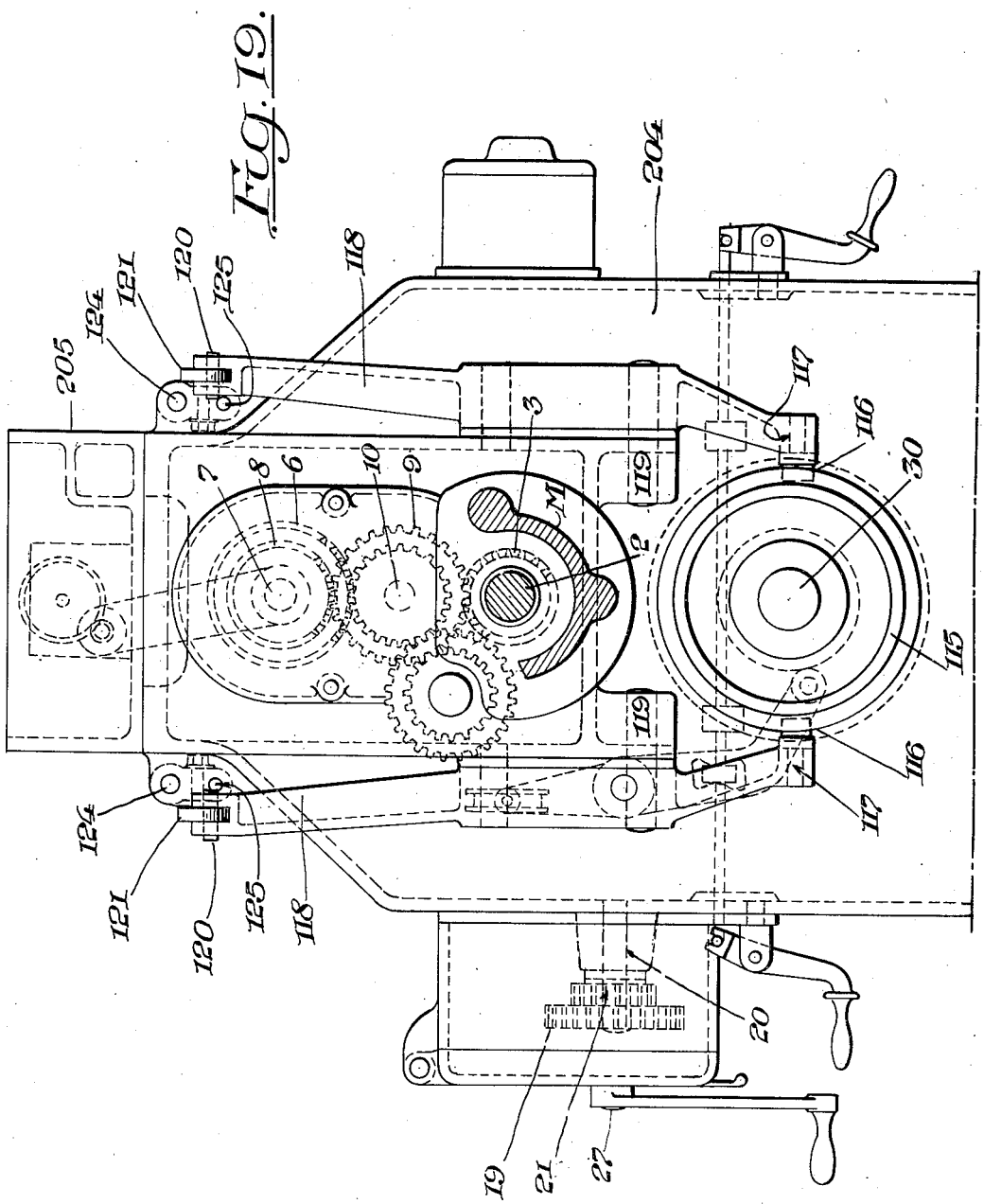
INVENTORS,
Alfred E. Drissner
Charlie W. Simpson
BY
ATTORNEY

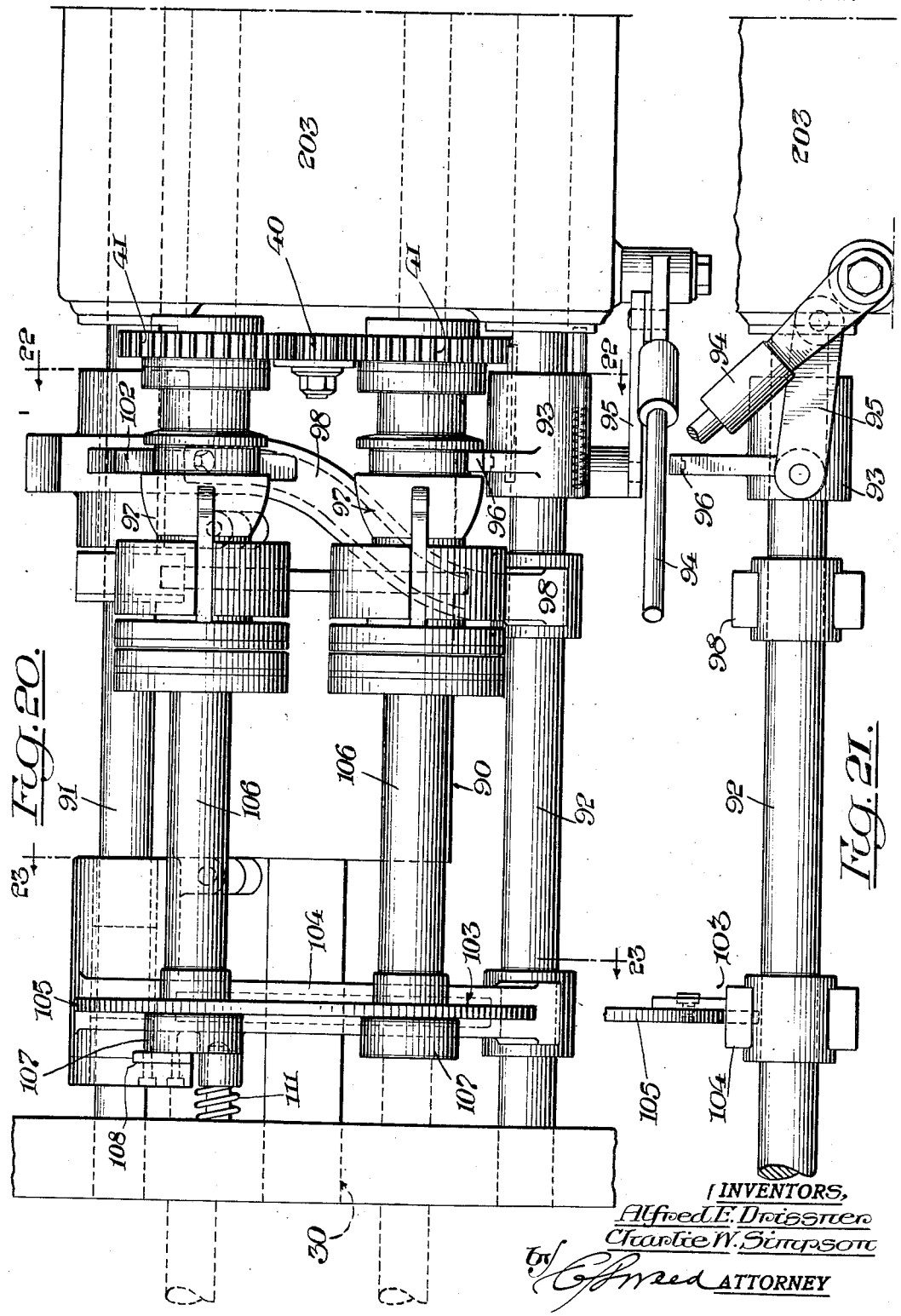

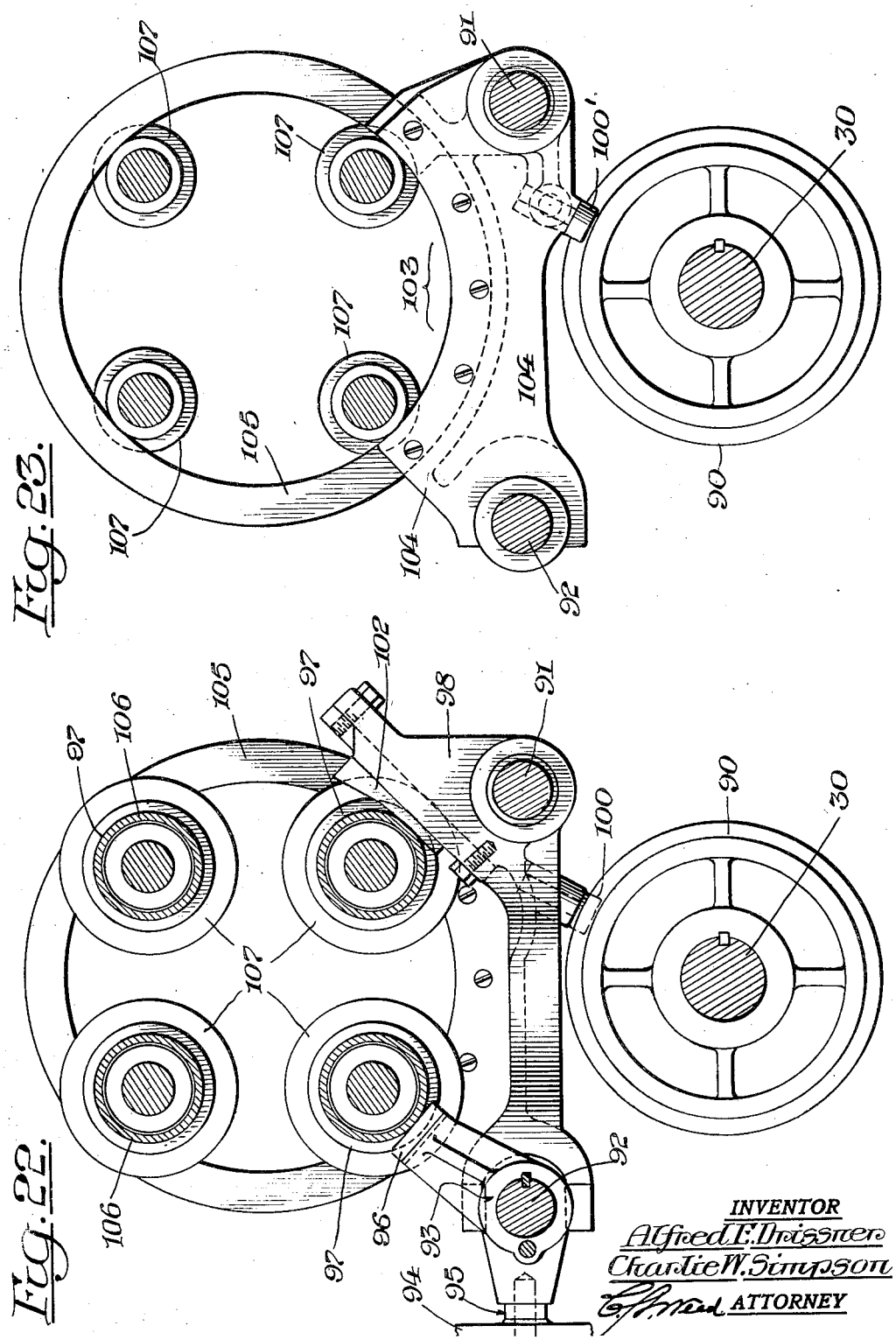

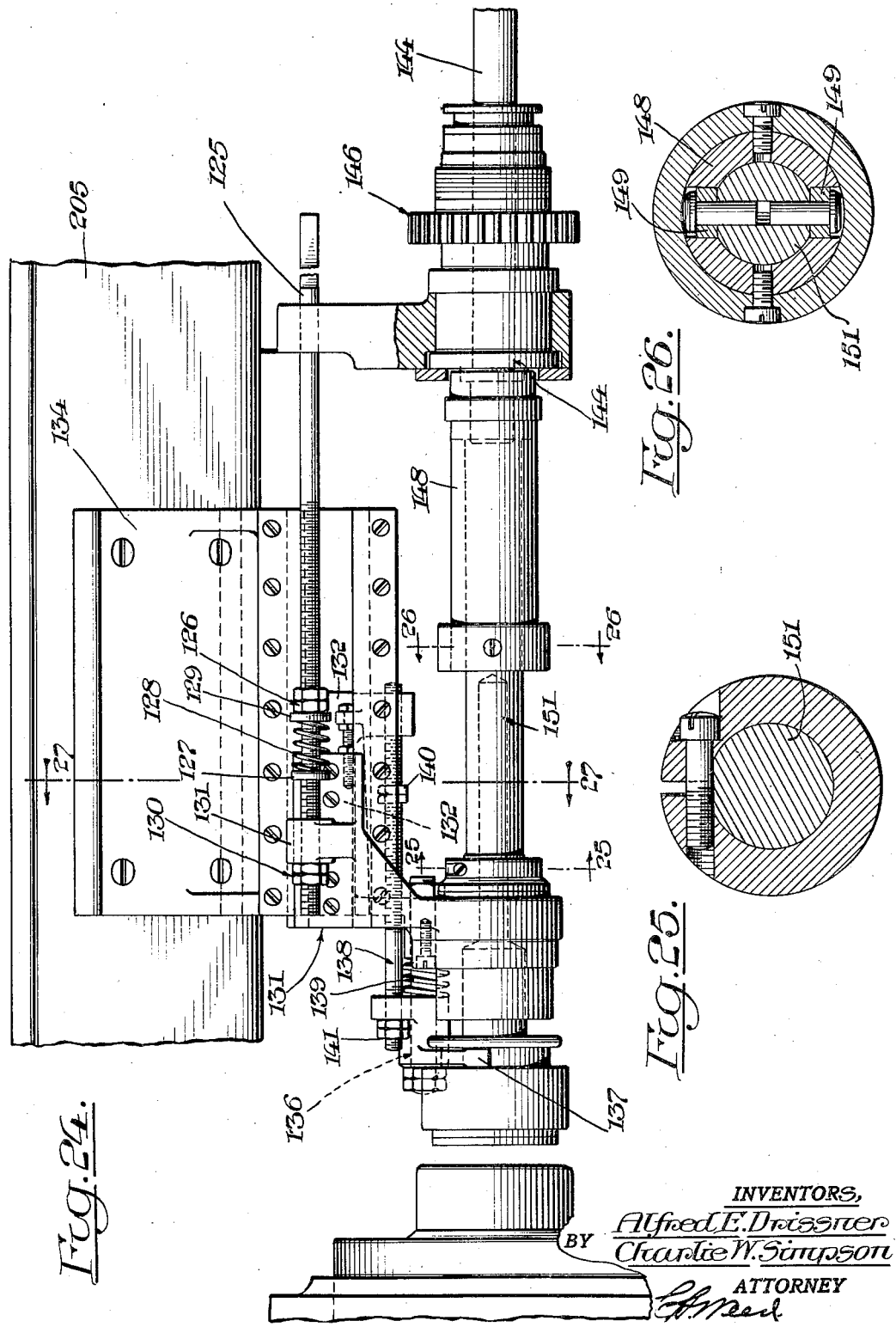

March 10, 1936.   C. W. SIMPSON ET AL   2,033,490
MULTIPLE SPINDLE AUTOMATIC SCREW MACHINE
Filed Sept. 10, 1932   21 Sheets-Sheet 19

INVENTORS,
Alfred F. Drissner
Charlie W. Simpson
BY
ATTORNEY

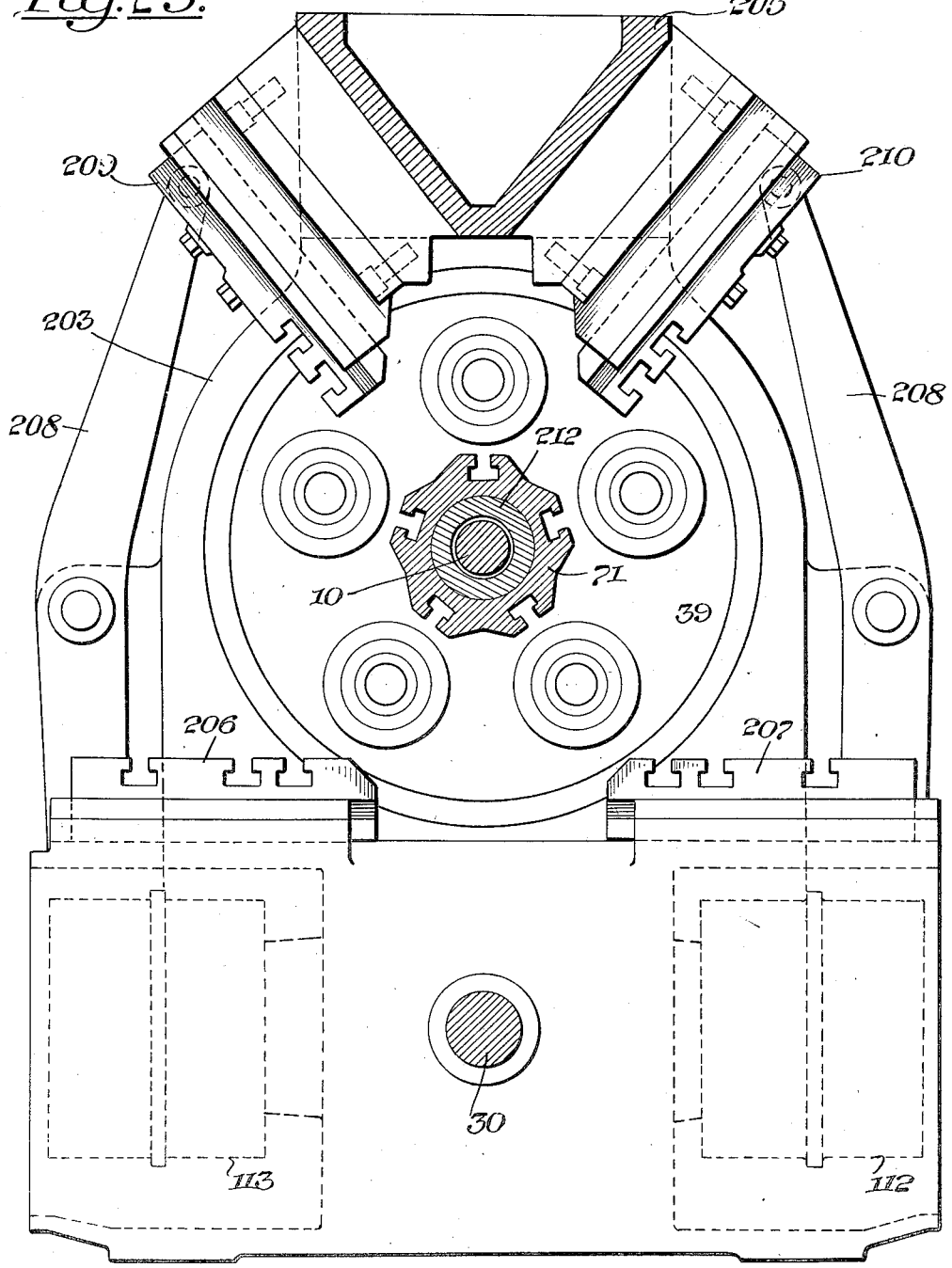

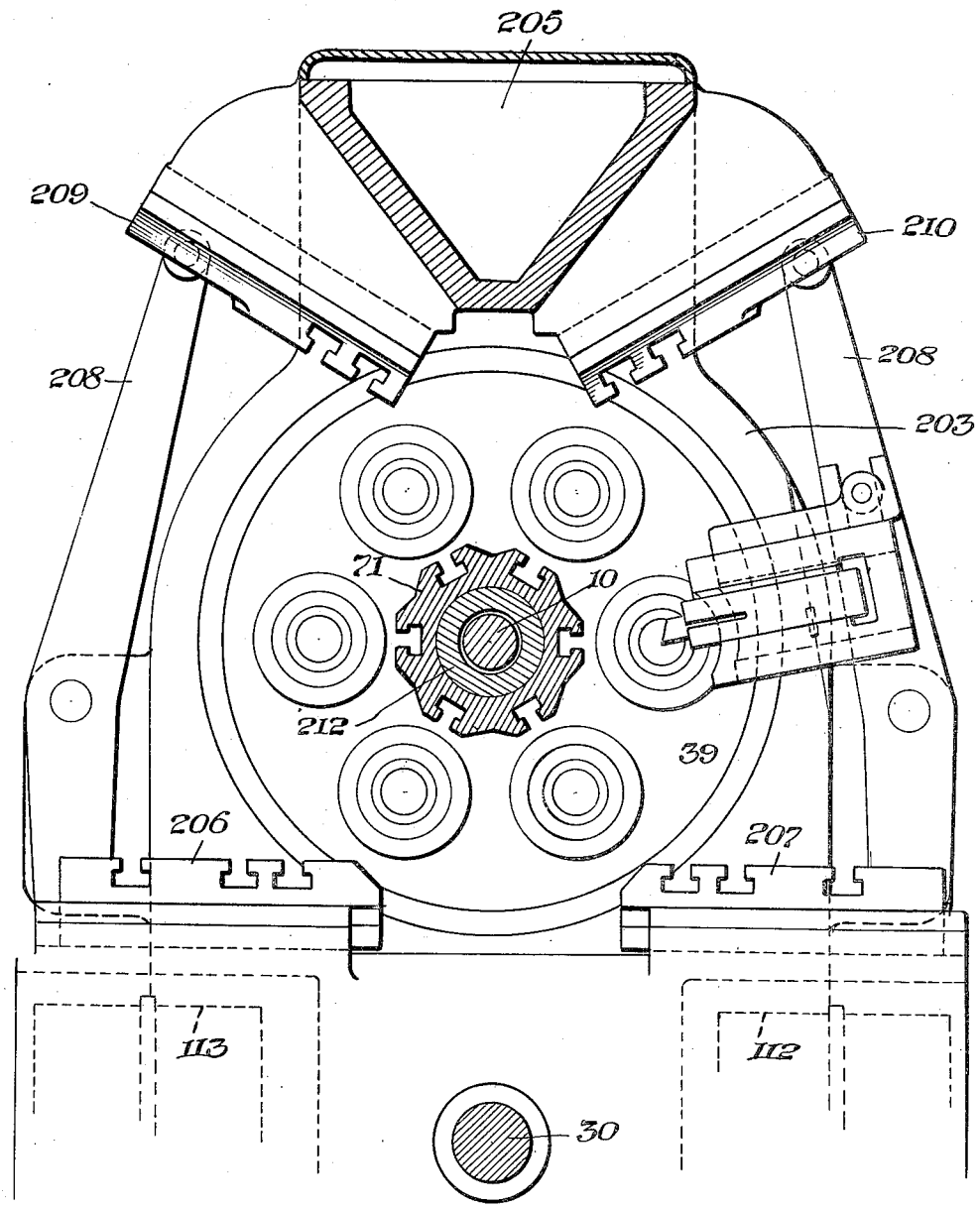

Patented Mar. 10, 1936

2,033,490

UNITED STATES PATENT OFFICE 2,033,490

MULTIPLE SPINDLE AUTOMATIC SCREW MACHINE

Charlie W. Simpson, Windsor, Vt., and Alfred E. Drissner, Cleveland, Ohio, assignors to National Acme Company, Cleveland, Ohio, a corporation of Ohio Application September 10, 1932, Serial No. 632,490

104 Claims. (Cl. 29—37)

This invention relates to automatic multiple spindle screw machines, the principal object being to provide a machine of this class in which the operating parts are more accessible, the speed of the tools is materially increased, and which machine can be readily transformed from a four-spindle to a five or six-spindle machine and in which a larger number of tools, a greater amount and increased variety of work can be turned out as compared with machines of this kind heretofore in use, thereby increasing the volume of production and the consequent lessening of the cost thereof.

A further object of the invention is the provision of a multiple spindle machine which also can be used as a chucking machine.

A further object of the invention is the provision of a machine of this class in which two uprights or housings carried by the bed are connected by a triangular overhead beam adapted to supporting the overhanging cross tools and which also may support slide-ways on both sides thereof for supporting and carrying threading die spindles or other end working tools, the construction being such that this overhead beam may carry two or more slides on opposite sides so that work may be done on the work carried by the various work spindles and the tools of which beam may be operated by a cam drum on the main cam shaft independently of the main cam drum that operates the main tool slide.

Another object of the invention is the provision of improved cross slide mechanism by means of which the cross slides may be operated from independent cam drums located directly under the slides whereby the cross slides are operated directly from the cams without intermediate levers and whereby overhang, spring and chattering of the tools are eliminated.

A further object of the invention is the provision of improved indexing means whereby the use of interchangeable spindle carriers having different sets of work spindles, for instance, four, five or six, may be readily interchanged in the same standard machine.

A further object of the invention is the provision of an improved indexing mechanism for the work spindle carrier whereby indexing thereof may be completely stopped before the locking bolt drops into position.

A further object of the invention is the provision of an improved machine in which threading spindles in two or more positions may be used and in which rotating tool holders such as high speed drilling, reaming or boring attachments can be used in all positions, this depending merely upon the number of work spindles used in the machines, and in which the work spindles can be stopped in different positions if required so that the machine can be used as a chucking machine for machine forgings, castings, stampings, etc., thus avoiding the necessity of building a special machine for this purpose.

A further object of the invention is the provision of an improved multiple spindle machine having a direct motor drive, thereby eliminating gears and chains commonly used in automatic screw machines.

A further object of the invention is the provision of an improved disappearing stock stop mechanism and mechanism for operating it whereby it is out of the way after the stock is fed and the chuck closed, thereby making it possible to use tools in this position so that a four-spindle machine having four independent cross slides is equivalent to a machine with a greater number of spindles.

Among the numerous advantages of this improved machine is the rigid support given to the cutting tools by reason of the massive construction of the frame; the accessibility of the tools whereby they may be easily adjusted, top cross slides being set at an angle instead of horizontally whereby access to the tools is facilitated; the location of the tool slide cam drum under the gear box section whereby the central space under the tool slide is left clear for chips; the improved forced feed automatic lubrication, the improved manner of construction and operation including independent cam control for each cross slide whereby heavy forming cuts may be made; the elimination of a large number of levers, links, pins and other small parts; the rapidity of the indexing work spindle carrier, the practical manner in which high tool spindle speed may be obtained and, generally, the simplicity of design and the facility with which a quick change of the set-up may be made and in which the machine can be readily arranged for cross drilling, cross tapping, milling and slotting operations, eliminating in many instances the necessity for secondary operations; the simplicity of the design and organization of the machine permitting its interchangeability from a four to a five or six spindle machine, thereby eliminating different designs of machine since the same frame, gear box drive, cam shaft with its cam drums, feed and chucking mechanism may be used with either four or more work spindles, the present improved construction eliminating the necessity of having different designs for different automatic machines with various numbers of work spindles, thus reducing manufacturing costs and inventories about one-third.

In the drawings accompanying and forming a part of this specification, Fig. 1 is a side view of this improved machine.

Fig. 2 is a perspective view illustrating the direct motor drive to the cam shaft and the work spindle carrier and spindles, showing the location and arrangement of the several gear trains for operating and controlling the operating parts of the machine.

Fig. 3 is an enlarged plan view partly in section illustrating the direct motor drive to the cam shaft.

Fig. 4 is a vertical sectional view of the right hand or gear box end of the machine and illustrating the direct motor drive.

Fig. 5 is a side view of the mechanism shown in section in Fig. 4.

Fig. 6 is a partly sectional view illustrating the high speed drilling attachment.

Fig. 7 is a cross sectional view taken on line 7—7 of Fig. 6.

Fig. 8 is a detail sectional view of a part of the mechanism shown in Fig. 6.

Fig. 9 is a right hand end view of Figs. 6 and 8.

Fig. 10 is a partly sectional view of the gear train for operating the threading mechanism.

Fig. 11 is a sectional view of one of the cam drums located on the cam shaft.

Fig. 12 is a cross sectional view of the machine taken on line 12—12 of Fig. 1.

Fig. 19 is a partly sectional view taken on line 19—19 of Fig. 1.

Fig. 20 is a plan view of the chuck operating mechanism of the work spindle carrier.

Fig. 21 is a detail side view of part of the mechanism shown in Fig. 20.

Figs. 22 and 23 are partly sectional views taken on lines 23—23 of Fig. 20, illustrating the chuck operating slide.

Fig. 24 illustrates the threading attachment.

Fig. 25 is a cross sectional view taken on line 25—25 of Fig. 24.

Fig. 26 is a cross-sectional view taken on line 26—26 of Fig. 24.

Fig. 29 is a partly cross-sectional view of the machine illustrating the spindle carrier having five work spindles.

Fig. 30 is a similar view illustrating the spindle carrier having six work spindles.

Similar characters of reference indicate corresponding parts in the several views.

Figure 1:
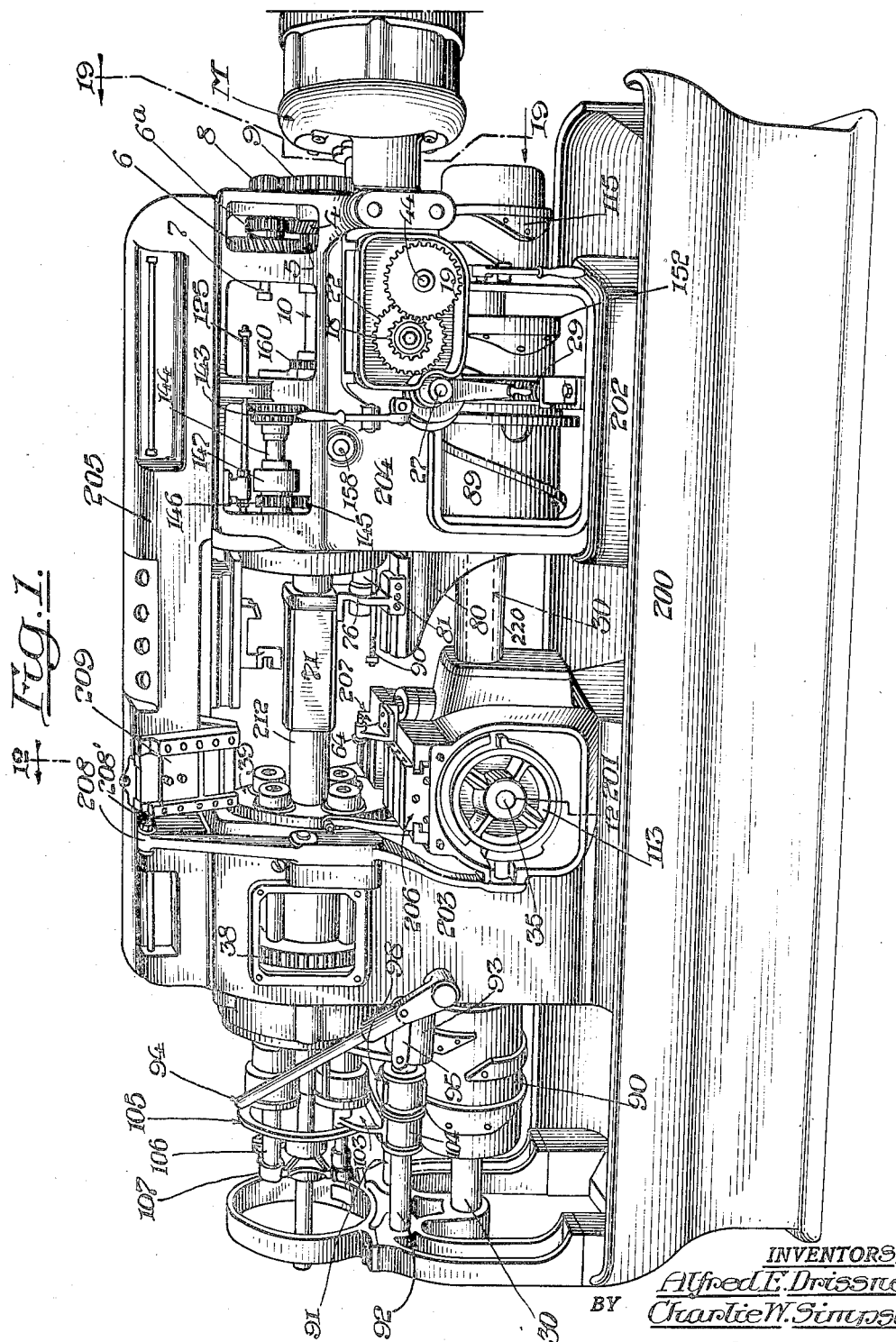
Figure 13:
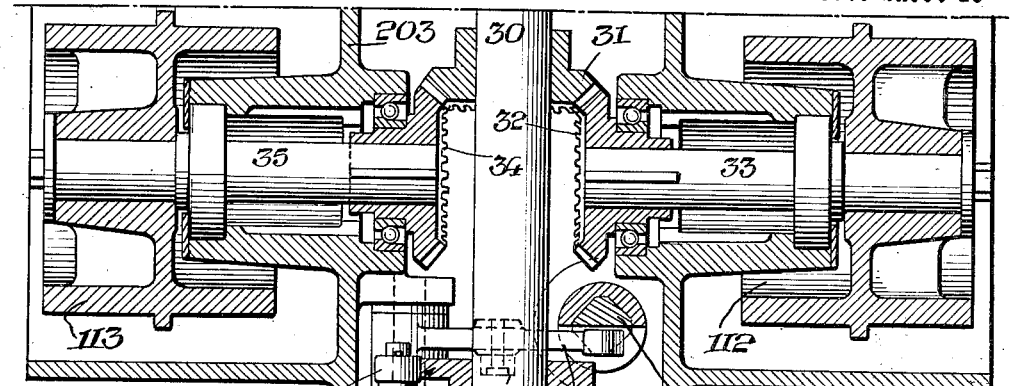
Fig. 13 is a horizontal sectional view of the mechanism shown at the lower part of Fig. 12.
Figure 14:
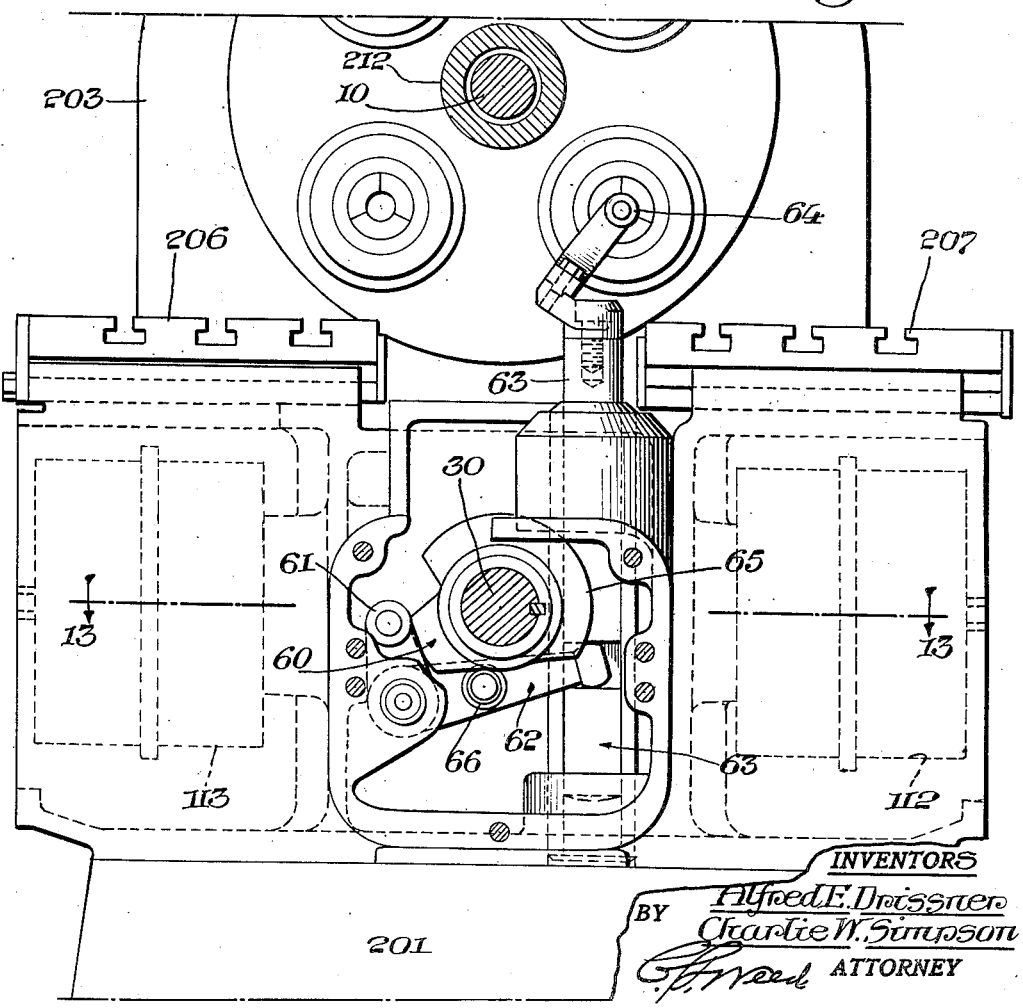
Fig. 14 is a view of the stock stop and its operating mechanism, as on the line 14—14 of Fig. 13.
Figure 15:
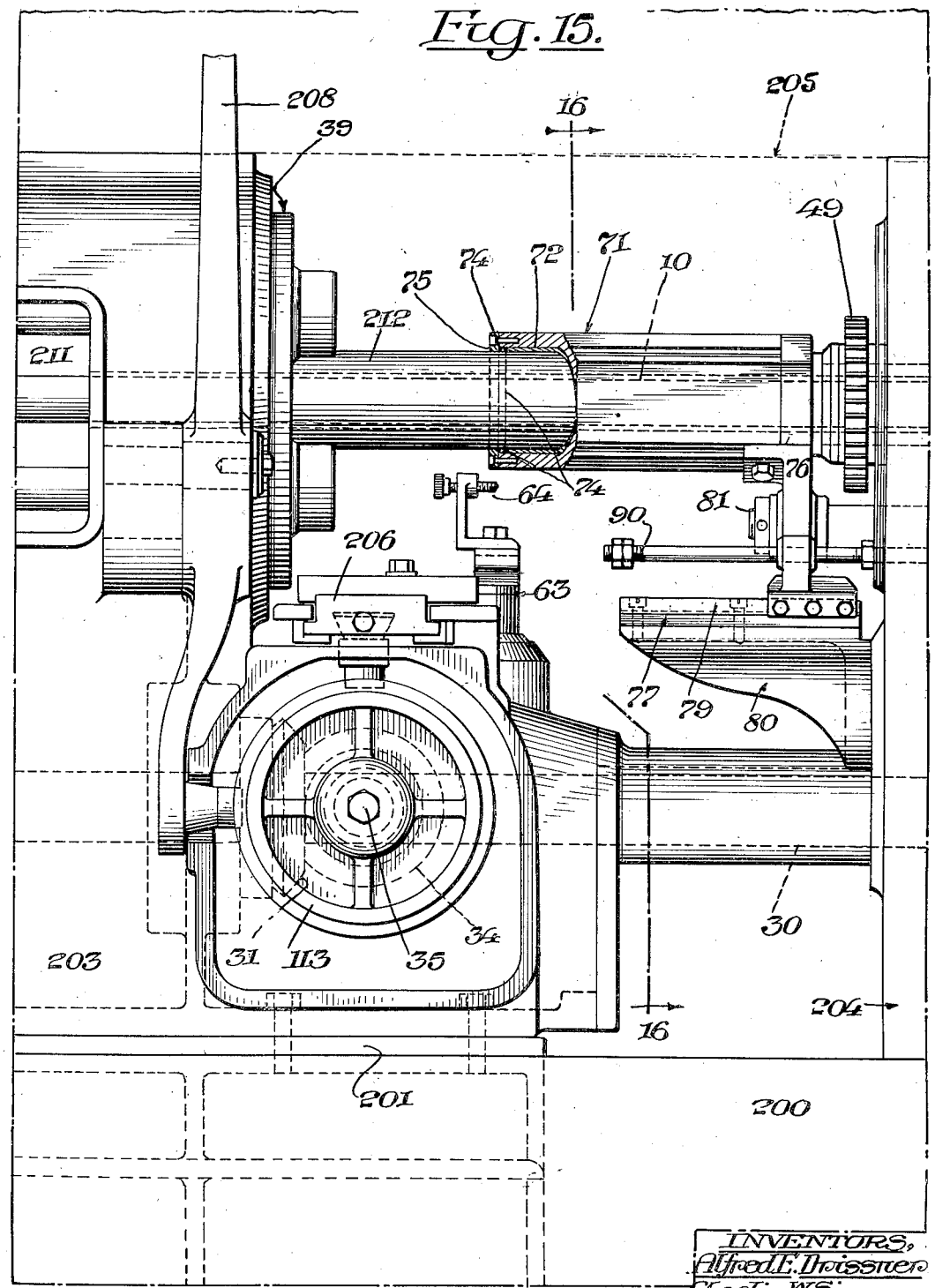
Fig. 15 is a side view of the main tool slide and its guiding means.

Before explaining in detail the present improvement and mode of operation thereof, we desire to have it understood that the invention is not limited to the details of construction and arrangement of parts illustrated in the accompanying drawings since the invention is capable of other embodiments and that the phraseology which we employ is for the purpose of description and not of limitation.

The framework

The base of the machine is constructed in the form of a pan 200, cast in one piece and heavily ribbed and provided with oil guards (not shown) on both sides thereof which are mounted on rollers to facilitate the inspection of the machine during operation and whereby they may be moved backward and forward to facilitate quick tool adjustment. This pan is so constructed that the chips may be removed from the front or rear end of the pan, a perforated sheet metal false bottom being provided for separating the oil from the chips.

This pan carries a pair of supports 201 and 202 for the two upright housings 203 and 204 and in the housing or head stock 203 is located the work spindle carrier and in the housing 204 is located the gears for the spindle drive and feed drive mechanisms and these two housings are rigidly connected at the tops thereof by a triangular beam 205 for supporting the top cross slides and other tool slides, and near the bottoms by a sleeve 220 through which the cam shaft 30 extends.

This overhead beam 205 in this improved machine is referred to herein as a triangular beam because it has two finished inclined or angular side faces between the work spindle carrier housing and the gear box or housing to which the ends of the beam are secured. Thus, tool slides and tools can be mounted on both side faces of the beam to operate both in the second and third positions of the work spindles simultaneously, thereby facilitating the use of twice as many sets of tools on the top beam and thereby materially increasing the productiveness of the machine while, at the same time, they are easily accessible and independently operated.

This formation of the beam or a similar formation of the supporting brackets makes it practicable to support side slides, die slides or accelerated reaming, or turning attachments on one or both side faces of the beam, in other words, to support both cross and end working tools on the side faces of the beam in proper position effectively to operate on the work carried by the work spindles.

There are many important advantages for this and among these is that the structure is more open, the tools easier to watch and stronger holders of different types can be applied than is possible in a machine where the tool holders are secured on the bottom or underneath a plate or bar for the reason that when secured to such under side or bottom of a bar, there is a limit to the height between the work spindle and bottom of the bar and, therefore, a limit to the size and strength of the tool holder and, of course, the tool that can be used, and only a single tool can be used but when mounted on the side faces of the beam, the height and strength of the attachments or slides or holders for supporting the tools and the size of the tools are practically unlimited. By supporting the tools so that they are more accessible and because of the more open space in which to work and by supporting them with stronger holders, the possibility of injury to the operator is also decreased.

Thus, in this improved machine, it is not only practicable to mount a sufficient number of tools on the top beam so that the work both in the second and third positions of the work spindles can be operated upon simultaneously instead of only one work spindle as heretofore but these side mounted tools can also be angularly adjusted for certain classes of work as hereinafter more fully set forth.

None of these important advantages is possible where the tool is supported by the bottom or under side of a bar or plate since it is not only impossible to mount more than one such tool but it cannot be angularly adjusted and, moreover, it materially interferes with the proper tooling of the machine since accessibility is decreased, productiveness of the machine limited as well as the size and strength of the tool holders and tools that can be used.

*The headstock or work spindle carrier housing*

This headstock 203, which is bolted to the support 201 of the pan is of the box type and not only carries the indexing work spindle carrier but also the 1st and 4th position cross slides 206 and 207 and supports the two oppositely located levers 208 operating the second and third position slides 209 and 210 mounted on the triangular connecting beam 205 (see Figs. 1 and 12).

On each side and below the first and fourth position slides 206 and 207 are the cam drums 112 and 113 operating all four slides. The first and fourth position slides 206 and 207 are operated directly from these cam drums while the second and third position slides 209 and 210 are operated from cams on the outer end of these drums by means of the levers 208, and suitable links 208', segments 208'' and racks 208'''.

In the form shown in Fig. 12, the slide operating means comprising the segments and racks are located in the cored out hollow part of the top beam 205 so that the operating means for the top cross slides may thus be in a unit with the top bracket and as the brackets carrying these top cross slides are bolted to the top beam which the cored out portion of the beam makes practical this permits the top cross slides to be located in any desired angular position.

Figure 27:
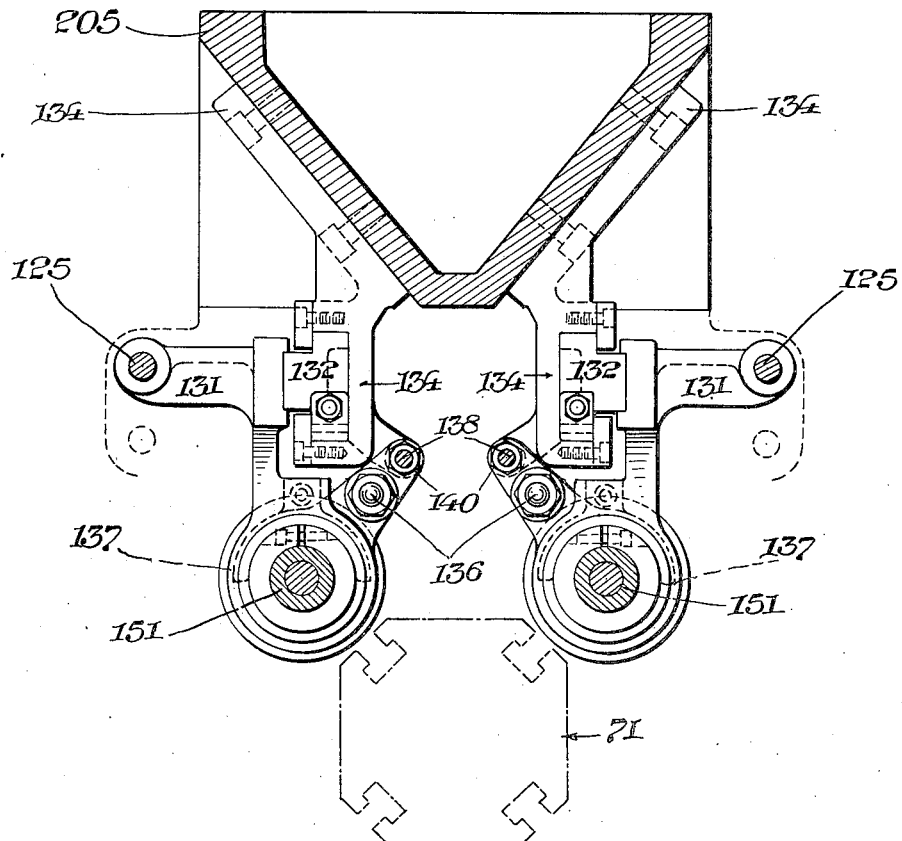
Fig. 27 is a partly sectional view illustrating the manner in which the threading attachment or other end working tools may be mounted on the triangular beam connecting the two upright housings of the machine, and taken on line 27—27 of Fig. 24.
Figure 28:
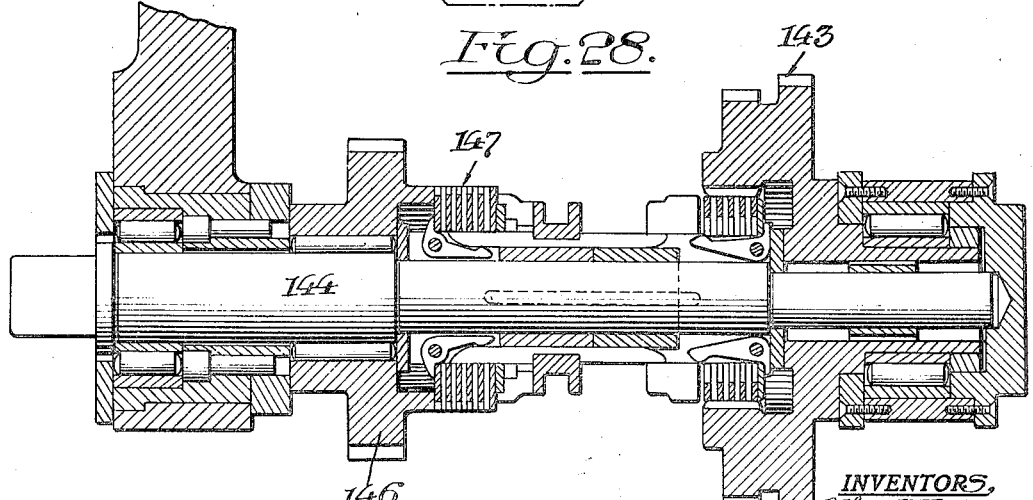
Fig. 28 is a longitudinal sectional view of the duplex clutch mechanism located at the right hand end of the threading spindle shown in Fig. 24.

As the threading mechanism hereinafter described is likewise mounted on the inclined sides of the top beam 205 (see Fig. 27) at the same angle as the top cross slides, it follows that by changing the angle of the bracket that carries either of the threading tools on the top beam, the threading tools can be used for accelerated turning at a speed of two to one or for taper turning or for turning any shape or form guided by the special guide cam provided in the bracket so that the brackets on both sides are really universal for different kinds of work and as the top cross slides are bolted on, they can also be arranged so that they can be used at an angle to face on an angle.

Where additional tools are necessary for handling more complicated work, and especially in a six-spindle machine, the levers 208 for operating the top slides in the manner shown in Fig. 12, also carry auxiliary tools or tool slides 230, (see Fig. 30) in which case, that at the right of Fig. 30 would act as a cut-off tool slide.

The spindle carrier contains four, five or six spindles as the case may be. In the headstock is also the indexing mechanism for the spindle carrier and this headstock also carries the stock stop mechanism both hereinafter described. Also connected with the headstock and the first position spindle is a hand chucking slide which allows the operator to chuck and unchuck at any time independent of the automatic chucking. Openings are provided in the spindle carrier housing to facilitate access to shims that can be removed and ground slightly thinner to take up wear in the housing of the spindle carrier bearing.

*Top beam*

The top beam 205 (see Figs. 1, 12, 27, 29 and 30) of this machine is of rigid box design and serves several purposes. It connects the gear box section and the headstock across the top, thus giving complete rigidity to the machine. It contains the lubricating pump and lubricators for automatically oiling all the bearings in the machine. This is accomplished by a series of pipes running from each oiler to each bearing so that each and every bearing has oil forced to it. The amount of oil that each bearing receives can be regulated and the surplus of oil is forced back into the oil reservoir. The cutting oil or coolant is pumped from the pan at the bottom of the machine into a passage on the side of the top beam, and from there distributed to the various cutting tools as required. On the two sides of this top plate are two angular finished surfaces carrying the two angular top slides 209 and 210. Both slides can be used for forming, shaping and carrying such other tools as may be required. The third position slide carries the cut-off tool.

In the rear of these finished angular surfaces are the brackets which carry the threading die slides for the second and third position threading dies and to these angular faces of the top beam 205 may also be attached any fixtures or attachments which may be operated in conjunction with the tooling of the machine.

*Spindle carrier*

Figure 17:
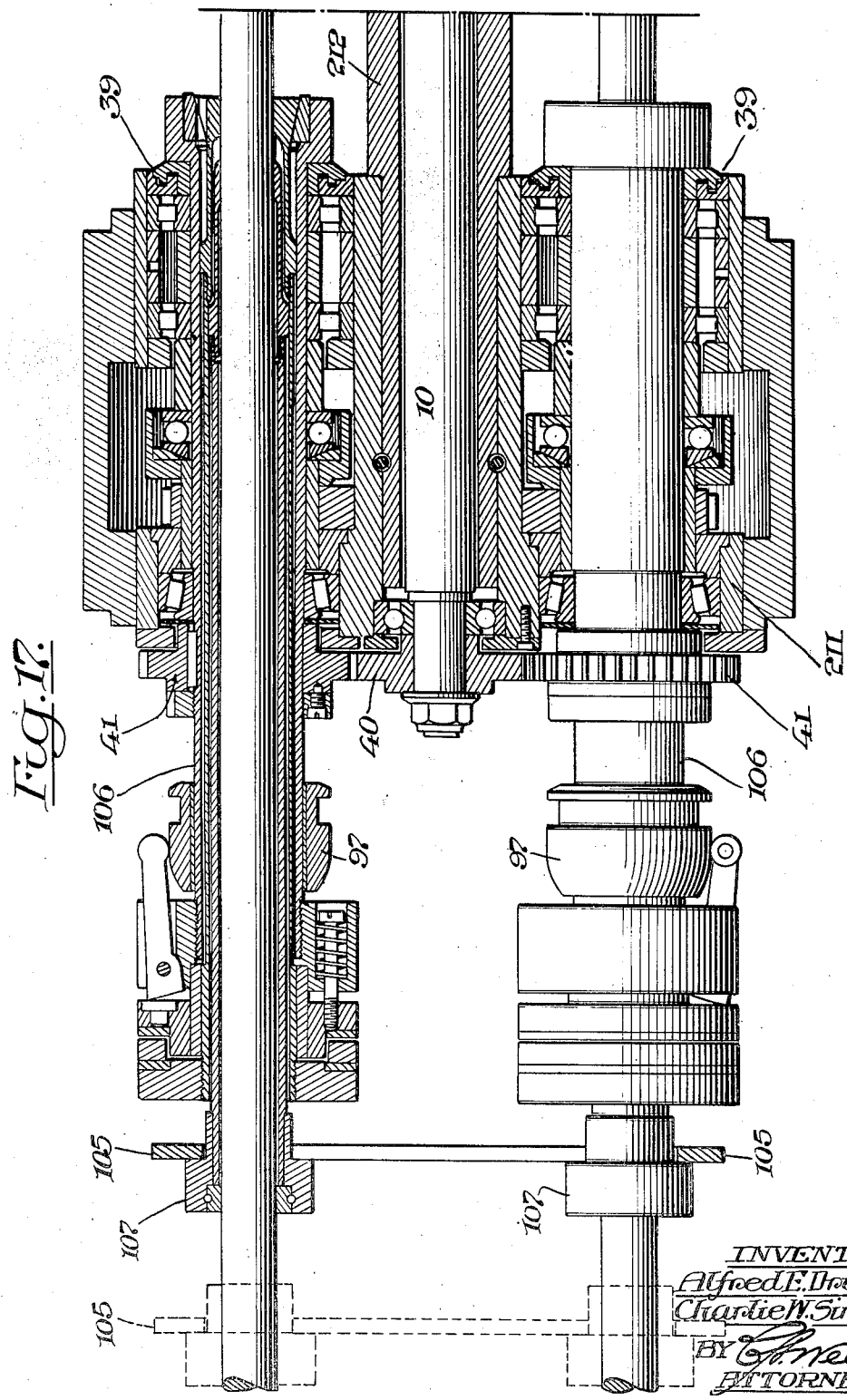
Fig. 17 is a longitudinal sectional view of the work spindle carrier.
Figure 18:
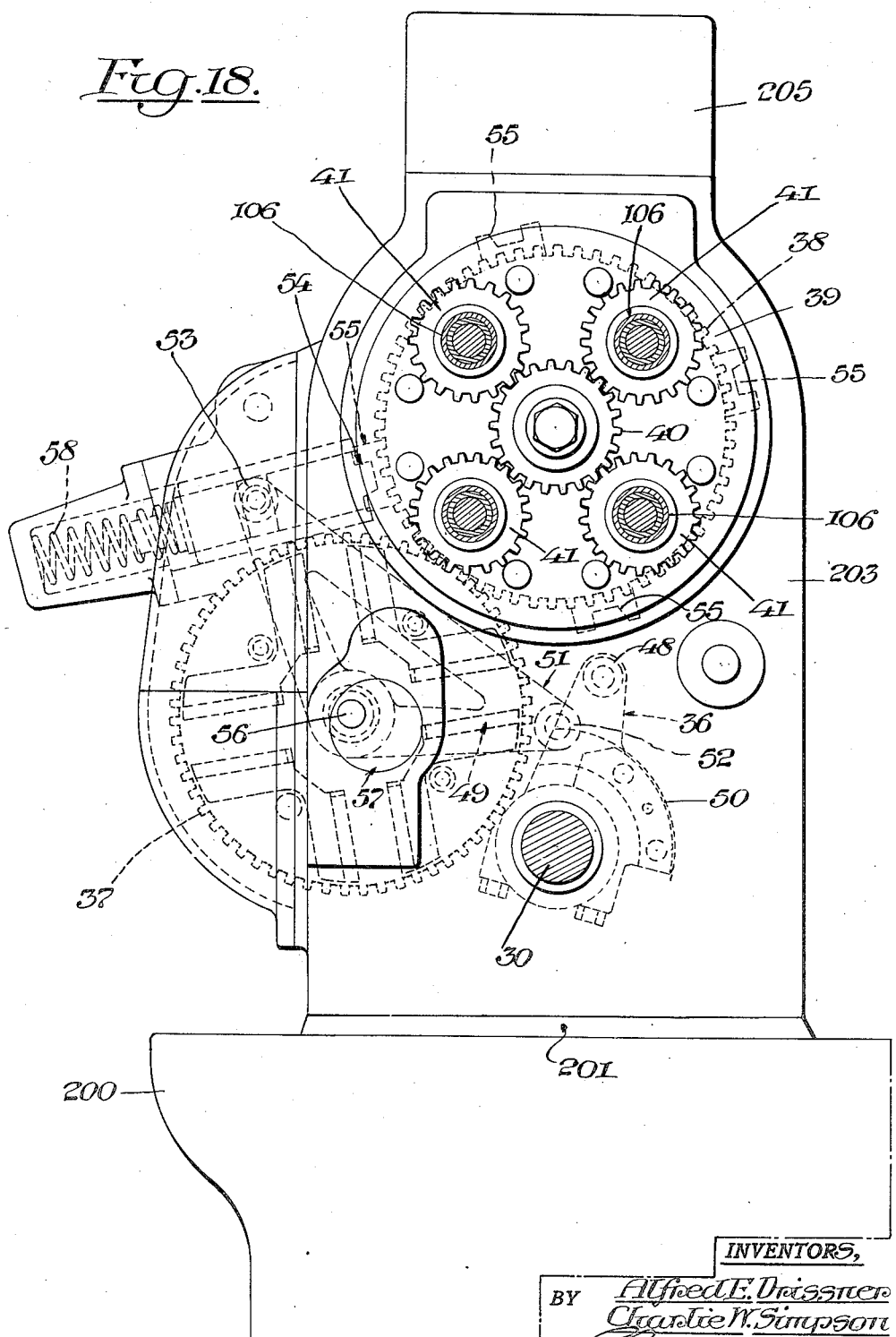
Fig. 18 illustrates the indexing mechanism of the work spindle carrier.

The work spindle carrier 39 (see Figs. 1 and 17) consists of two large discs joined by an intermediate section. The front one of these discs carries the locking blocks for the locking bolts (see Fig. 18) and the front of the rear disc carries the index gear. From the center of the spindle carrier projects a hardened steel tube 212 indexing with the spindle carrier, the opposite end of which extends into the gear box of the machine. On this tube is mounted the tool slide 71 to which are attached all end working tools. Revolving on antifriction bearings in the carrier are the radially located work spindles, and the front disk supports the forward end of each spindle by two cylindrical roller bearings which carry the entire radial load at this end of each spindle. Rearwardly and in front of the rear discs is a plain thrust bearing and to the rear of which are taper roller bearings carrying the radial load at the rear end of the spindle and the thrust from the chucking slides. Running through the tube 212 and the center of the spindle carrier itself, is the spindle drive shaft 10. On the rear end of this shaft is the spindle drive gear 40 meshing with gears 41 on the work spindles for rotating the same. The spindle bearings shown in Fig. 17 form the subject-matter of an application filed January 19th, 1934, Serial Number 707,286.

Indexing and locking mechanism for work spindle carrier

As the cam shaft 30 (see Fig. 18) rotates, the arm 36 carried thereby engages through its roll 48 with lugs 49 on the indexing gear 37 carrying this indexing gear through 90°. This indexing gear 37 meshes with a gear 38 fastened to the work carrier 39. Thus, as the cam shaft 30 rotates with the roll 48 between the lugs 49, the gear 37 is rotated through 90°, causing the meshed gear 38 to rotate also, and as the gears 37 and 38 have the same number of teeth, the gear 38 is also rotated 90°, or from one spindle position to the next.

Fastened to the side of the indexing lever 36 is a cam 50 which, as the roll 48 on the lever 36 comes into contact with the lug 49, engages the lever 51 which, through its stud 53, withdraws the locking bolt 54 from its locking seat 55 fastened in the work carrier 39. When the locking bolt 54 is forced back by the cam 50, the spring 58 is further compressed. As the indexing lever 36 rotates thus rotating the indexing gear 37, a roll 52 carried by the lever 51 rides on the cam 50 until the lever 36 has passed through 90° of its travel. At this time the carrier 39 has indexed to the next position and the roll 52 drops from the end of the cam 50 permitting the spring 58 to force the locking bolt 54 into the seat of the locking block 59 with the work carrier ready for the next operation.

In a five spindle machine, the gear 37 is replaced by one having less teeth and the eccentric bushing 57 is reset in order that the smaller gear will mesh with the gear 38. The ratio of the smaller gear to the gear 38 is such that the gear 38 will be revolved through 72°, or one-fifth. This also applies to a six spindle machine in which a stud 56 is reset in still a third position and a smaller gear is used in place of the gear 37. Thus, by increasing or decreasing the gear 37, a less or greater number of spindles may be used in this machine without redesigning the whole machine as heretofore.

It will be observed that this indexing mechanism is so constructed that the gear 37 carries but four lugs which correspond with the number of rotating spindles in a four spindle work spindle carrier and when this gear 37 is interchanged with gears having a lesser number of teeth, these gears also carry the same number of lugs, to wit, four, the result being that the interchangeable work spindle carriers having either four, five or six spindles are all indexed by the same number of lugs carried by the gear 37. In other words, it is not necessary to substitute a gear having five lugs or one having six lugs.

The locking bolt 54 is located at an angle in the framework (see Fig. 18) and this makes it possible to use the interchangeable work spindle carriers or turrets without changing the seating position for the locking bolt in the spindle carrier and without any change in the frame or the position of the locking bolt. If the locking bolt were horizontally located so as to work, for instance, with a four spindle turret, it would interfere with one of the spindles when a five or six spindle carrier was substituted so that the position of the spindles or the bolt seat in the carrier or the position of the locking bolt would have to be changed each time but by locating this bolt at an angle, this permits a four, five or six spindle turret to be used without changing the location of the spindles or of the bolt or bolt seat in the carrier so that the same frame carrying the bolt may be used with any one of the different turrets, this resulting in a great saving in manufacture.

The number of lugs or roller guides 49 used and which are carried by a plate secured to the intermediate gear 37, is determined by the working length of the lever or arm 36 carried by the cam shaft 30 and the working length of this arm is determined by the distance between the center of the cam shaft and center of the roller 48 so that a smaller or larger gear than that shown would carry the same number of roller guides or lugs 48 and the working length of the arm would determine the number of these roller guides or lugs used.

The advantage of this construction is that it enables different intermediate gears 37 to be used without changing the number of roller guide-ways or lugs which may initially have been adopted for one particular size of gear and also without the necessity of changing the gear on the indexible carrier or the working length of the index arm.

Stock stop

At the instant the locking bolt 54 enters the seat of the locking block 59, the cam 60 (see Figs. 1, 13, 14 and 15), attached to the cam shaft 30 comes in contact with a roll 61 lifting the stock stop lever 62 which, in turn, lifts the stock stop plunger 63 and brings the adjustable stock stop screw 64 in line with and in front of the fourth position work spindle. At this time the machine is ready for feeding the stock bar. As the cam 65 rotates and the roll 61 rides over the dwell of the cam 60, the stock bar is securely chucked, then as a section of the stock stop cam 65 comes in contact with the roll 66, the stock stop is returned to its original position in order that the tools on the fourth position may pass over the stock stop.

This disappearing stock stop is housed below and between the two lower cross slides in the lower part or extension of the headstock 203 and when lowered is entirely out of the way, being directly operated from the main cam shaft 30 which, by the means described, raises and lowers it into and out of working position so that when lowered, the fourth position work spindle in a four spindle machine and the fifth position spindle in a five spindle machine, etc., is free for tooling operations, thus materially increasing the possible tooling operations.

Tool slide mechanism

Figure 16:
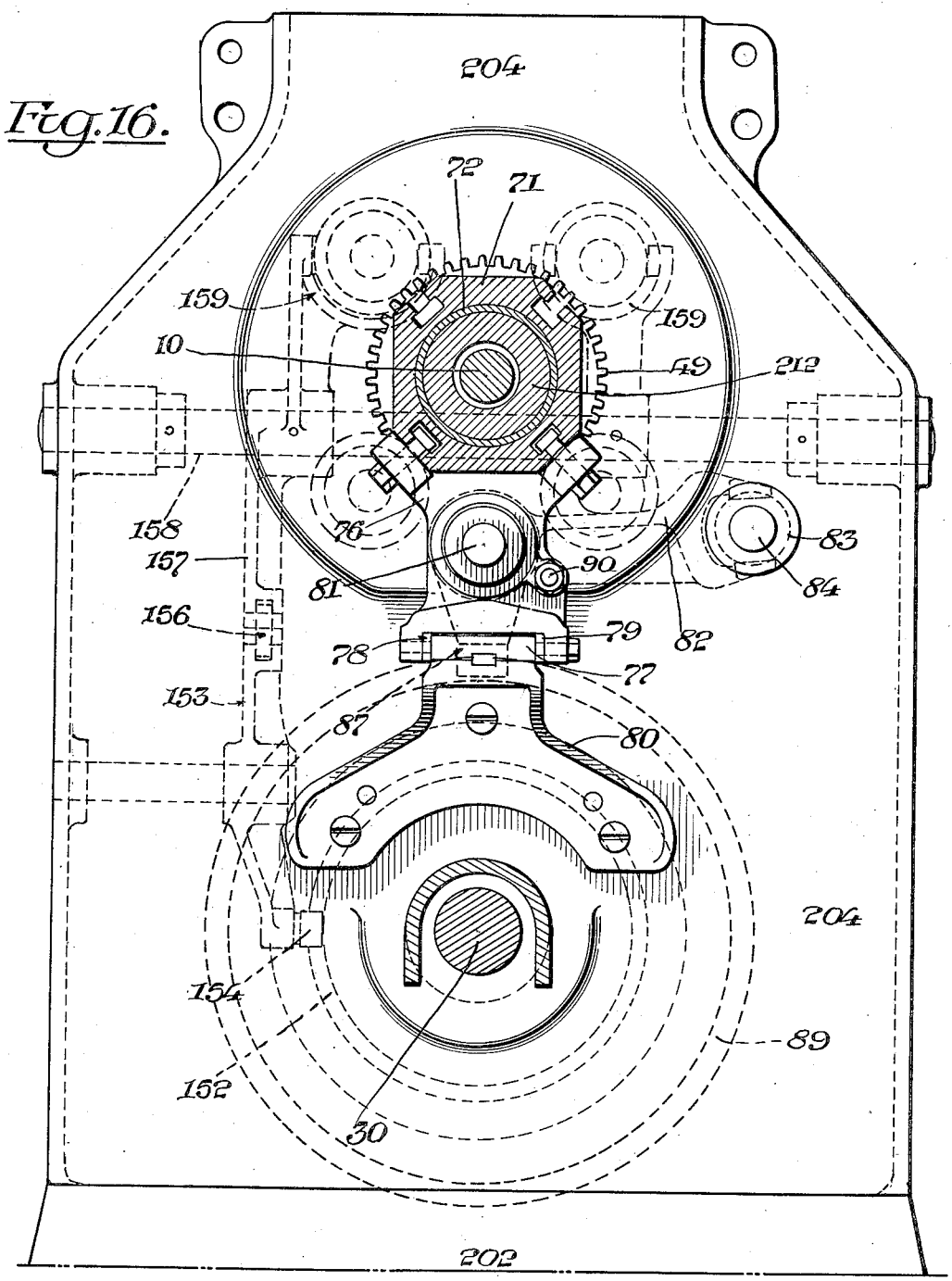
Fig. 16 is a partly sectional view taken on the line 16—16 of Fig. 15.

Sliding on the spindle carrier tube 212 (see Figs. 1, 15 and 16) is the tool slide 71 which carries the end working tools and any desired side or turning tools such as box tools. This tool slide has in each end a bronze bushing, as 72. In front of the forward bushing 72 is a felt ring 74 which keeps the dirt and chips from working beneath the bronze bushing 72. The felt ring is held in place by a ring 75 which is fastened directly to the tool slide itself.

In each corner of this tool slide is a T-slot used for bolts and nuts to hold all tool holders securely on the tool slide. Each one of these T-slots is located radially in line with each spindle position in the carrier. In the center of the tool slide and between the two bronze bushings 72 is a recess which contains the lubricant for the tool slide. At the rear of the tool slide is the actuating arm 76, the upper end of which is fastened to the tool slide. The lower end is guided by a flat hardened steel guide 77 which controls through gibs 78 and 79 the accuracy and alignment of this tool slide. This guide is securely fastened to a bracket 80 fastened to the outside of the gear box section. Between the guide 77 and the tool slide 71 and connected to the arm 76, is a bar 81 extending into and sliding on suitable bearings of the gear box section. On this bar 81 and securely fastened to it is the roll arm 82 (see Fig. 16) having a bifurcated projection to the spool 83 which slides on a shaft 84. The hub of this roll arm 82 projects downward and carries a roll 87 on its lower end (see Figs. 2 and 16) and this roll 87 is actuated by cams on the drum 89 of the cam shaft 30 (see Fig. 2), which thus moves the main tool slide back and forth. The side projecting arm 82 to the spool 83 holds the roll arm from revolving through the action of the cam on the drum 89, and the cam drum 89 is rotated by the mechanism in the gear box by the cam shaft 30. When the tool slide 71 is driven forward by the cams on the drum 89, it is stopped in its forward position by a stop rod 90 which, with the adjustable nuts form a positive stop for the forward movement of the tool slide. The cam drum 89 on the cam shaft 30 is located in the gear box or housing and is thus protected from dirt and chips. By having the guiding means for the main tool slide extending below that slide and located between the bed of the machine and the main tool slide, the main tool slide 71 is thus entirely independent of the auxiliary or finishing tool slide carried by the beam above it and has no direct connection with that beam carrying the auxiliary tool slide and yet the main tool slide has the necessary means for guiding it and this means is also utilized for shifting the main tool slide.

*Gear box mechanism*

The gear box or housing 204 contains the gearing (see Figs. 1, 2, 3, 4 and 5) for driving the work spindles and stock bar feed mechanism. At the front end of the gear box is the motor M which is directly connected to the machine instead of indirectly as heretofore since the end of the motor shaft carries the gears by means of which both the work spindles and stock feed are driven. This motor shaft 2 of the gear train (see Figs. 1, 2 and 3) of the motor M carries the gear 3 meshing with the gear 4 and attached to the side of the gear 4 is the gear 5 meshing with the gear 6. By replacing the gear 6 by a gear such as 6a (see Figs. 2 and 10) to mesh directly with the gear 4, a higher spindle speed may be obtained.

Gears 4 and 5 are in one piece and act as an idler gear running on the work spindle drive shaft 10. The gear 6 is fastened to and rotates with the shaft 7 on the end of which is the change gear 8 meshing with the change gear 9 which is securely fastened to and rotates with the shaft 10 which is the work spindle drive shaft passing through the center of the work spindle carrier and the tube 212. By changing the gears 8 and 9, the speed of the shaft 10 and, incidentally, the speed of the work spindles can be varied as desired. Secured on the shaft 10 is the gear 11 which drives the gear 12 fastened on the shaft 13 to which is secured the worm 14. This, in turn, drives the cross shaft 16 through the worm wheel 15. The shaft 16 has a squared outer end (see Fig. 3) driving the collar 17 and this, through pins or lugs, drives the gear 18 which meshes with the gear 19 fastened to the gear 21. The gears 19 and 21 rotate freely on the stud 20 and the gear 21 meshes with the drive gear 22 which drives, through pins, the roller clutch 23 driving the gear 24. The gear 24 rotates freely on the shaft 16 meshing with and driving the gear 25 which, in turn, through the clutch 26, drives the shaft 27.

Fastened to the shaft 27 is a worm 28 which, in turn, drives the wormwheel 29 on the main cam shaft 30 which rotates the various cam drums on which are the cams giving the various parts of the machine motion at the proper time. On the cam shaft 30 is a bevel gear 31 driving from each side and through bevel gears 32 and 34 the shafts 33 and 35 on which are mounted the cam drums 112 and 113 operating the four cross slides. By replacing gears 18, 19, 21 and 22 by larger or smaller gears, faster or slower speeds of the cam shaft 30 are obtained. In this way, coarser or finer feeds are obtained for each work spindle rotation. During this time, the clutch 45 hereinafter referred to is disengaged. After the parts being made have been cut off from the bar, the tools must be returned and the work spindles must be indexed for the next operation. To do this without loss of time a greater speed is necessary than at the time when the tools are cutting. To accomplish this, there is fastened to the end of the motor shaft 2 a bevel gear 42 meshing with a bevel gear 43 on a cross shaft 44. A clutch 45 (see Fig. 3) is automatically engaged through a cam and thus the speed of the gear 46 (see Fig. 3) is accelerated which, in turn, drives the gear 24 at a greater speed than when driven through the gears mounted on the shaft 16 and the stud shaft 20. Therefore, the gear 24 will "run away" from the roll clutch 23 and will run as an idler gear on the shaft 16 driving the gear 25 which, in turn, drives as before the worm 28 but at a greater speed, thus returning the cross slides and main tool slide and the indexing of the work spindle carrier with the least possible loss of time. This completes the cycle of the cam shaft 30 and one indexing of the machine. The operator in setting his tools may start or stop the movement of the cross slides and tool slide at any time. This can be done by engaging or disengaging a suitable clutch 26 (see Fig. 3) which at once stops or starts the operation of the slides.

*High speed drilling attachment*

The attachment for carrying the high speed drill is secured to the main tool slide 71 as hereinafter pointed out. Securely fastened to and rotating with the work spindle driving shaft 10 is the driving gear 160 (see Figs. 2, 8, 9 and 10) which is located in the gear box and meshes with an idler gear 161 on the stud 162 (see Figs. 8 and 9). The gear 161 meshes in turn with the gear 163. As the stud 162 can be made eccentric, the ratio between the gears 160 and 163 may be readily changed, thereby altering the speed of the drill. The gear 163 is fastened to and rotates with the sleeve 164 extending through the gear box section and carries at its opposite end the gear 165 fastened to it (see Figs. 6 and 10). The gear 165 meshes with and drives the gear 49 which turns as an idler gear on the work spindle carrier tube 39 and in turn drives the gear 166 having a splined hub for driving the sliding drill spindle 167 (see Figs. 6 and 9). The head of the spindle 167 is mounted in a sleeve 170, which is clamped tightly to the tool holder 168. The drill spindle 167 rotates freely in the sleeve 170 and has in its head a split bushing 169 for holding the drill. The holes in these bushings are made of different sizes to carry varying sizes of drills or tools. Where more than one high speed drilling attachment or other rotating tool is required, there is situated radially around the center gear 49 and in line with each spindle, several gears 166 through which may be driven the spindles of the rotating tools. All spindles similar to 167 are driven in the manner described above. These drills or other rotating tools receive their feed from the main tool slide 71 to which the tool holder 168 is securely fastened, the feed being furnished through the cams driving the main tool slide. By this mechanism, the rotating or drilling tools are pushed forward instead of, as in the old Gridley machines, pulled forward and are also operated from the motor end of the machine instead of the work spindle end of the machine.

*Threading mechanism*

On one end of the cam shaft 30 is a cam drum 115 for operating the threading tools (see Figs. 5, 19 and 24). This cam drum is divided in two sections, one section carrying cams for threading on second position, and one section carrying cams for threading on the third position. On the gear box of the machine there are two pads, one on either side. To these pads the threading levers 118 are pivoted and each pad and lever has two holes, one above the other, and by changing the stud 119 (see Fig. 19) from one to another, the length of the throw on the die slides may be varied. On each lever 118 is a stud 117 carrying a roll 116 which comes in contact with the cams on the drum 115. Attached to the top of the lever 118 is a link 121 by a pin 120. The other end of this link is attached to a bracket 123 which slides on a shaft 124. In this bracket is a threaded rod 125 (see Figs. 5 and 24) to allow for adjustment in the throw of the die slide. The rod 125 extends through the die slide 131 and is provided with nuts 126 and 130. Also on this rod is a spring 128 and two collars 127 and 129. This spring serves as a bumper in starting the die onto the work and is adjustable for length of throw and tension by the nuts 126 and 130. The die slide 131 is attached to a die slide block 132 which slides in the threading bracket 134 secured to the triangular top beam 205. This slide block 132 is held in place by suitable gibs and is adjusted by a suitable taper gib. Thus, by having the threading tool spindle or other end working tool supported on the slide 131, (see Fig. 24) attached to the die slide block 132 shiftable back and forth on the bracket 134 secured to the side face of the triangular top beam 205, the slide is always in position to support the threading tool close to the work as it moves forward with the threading tool and, therefore, it follows that there is no overhang of the threading tool at any time as it follows on to the work, as is the case, for instance, where the threading tool spindle is mounted in rigid supports bolted in a fixed position to the under side of such a beam.

In other words, when the threading tool spindle is bolted in a fixed position, obviously there is no support for the threading tool close to the work as the spindle moves forward relative to its fixed point of support. Consequently, there is considerable overhang of this tool as the threading die follows on to the work and the farther it follows on to the work, the greater the overhang of the tool resulting in chattering, vibration and imperfection in the threading operation.

In the present improvement, however, as the threading tool and its spindle are always supported by the shiftable slide on a rigid support adjacent to the working position of the tool, there is no overhang of the tool relative to the work which is an important advantage in machines of this character.

Furthermore, the slide and support of the threading tool at the side face of the beam makes it practicable to also support top or cross tool slides on the beam which would not be practicable if the threading tool were supported at the under side of the beam since this would interfere with the use of such top or cross tools as one would be in the way of the other, for certain positions of the work.

The die slide 131 carries the die slide spindle 151 and on the die slide 131 is a stud 136 which in turn carries a die yoke 137 which is free to slide back and forth. Between the die yoke 137 and the die slide 131 is a spring 139 which serves to hold the yoke forward and the die closed. On the die slide bracket 134 is a boss which has a tapped hole and carries a rod 138. This rod is threaded and carries nuts 140 and 141. By adjusting these nuts 140 the die is closed on its backward stroke and by adjusting the nuts 141, the die is opened on its forward stroke. This is caused by the boss on the die yoke 137 coming in contact with these nuts.

On the shaft 10 is a gear 142 (see Figs. 2, 4 and 10) which has two sets of teeth. This double gear in turn meshes with the clutch gear 143 on a die shaft 144. This clutch gear also has two sets of teeth. By adjusting the gear 142 on the shaft 10, two different threading speeds may be obtained.

On the shaft 10 is a gear 145 which meshes with a clutch gear 146 on the die shaft 144. This set of gearing runs the die at a greater speed than the spindle and therefore returns the die over the work and is also used for left hand threading. On the clutch shaft 144 is a twin disc clutch 147, which is operated by cams and levers backward and forward so that the die or tap is started at the proper time and returned at the proper time.

To the end of the clutch shaft 144 nearest the spindle is attached a die spindle sleeve 148 which, in turn, through rollers 149 on the die spindle 151, drives this spindle. The end of this spindle carries the die or tap as the case may be.

On the cam shaft 30 is the cam drum 152 for operating the threading clutch 147 by means of a lever 153 carrying a roll 154, which, coming in contact with the cams on the cam drum 152, operates the lever backward and forward. The other end of the lever 153 is attached to a link 156 (see Fig. 4). This in turn is attached to a lever 157 secured to the shaft 158 (see Fig. 16). At one end of this lever 157 are two shoes 159 which operate the clutch 147. The lever 157 is securely fastened to the shaft 158 and thus, through the movement of the lever 153, an oscillating movement is given to this shaft 158 and securely fastened to this shaft 158 may be placed yokes operating clutches in other positions.

*The operating slides at the rear of the machine*

The hand chucking slide 93 (see Figs. 1, 20, 21, 22 and 23) is used for opening and closing the collet chuck at the option of the operator. This is operated by the lever 94 through the link 95 to the slide 93. This slide 93 carries the shoe 96 which projects into a groove of the spool 97 and by shifting the slide 93 on its bar 92, the spool 97 slides longitudinally on the spindle in the first position. This spool acts as a wedge to lift the fingers which draw back the collet and in this way chucks or grips the stock. A slide 98 is mounted on a parallel bar 91 and has an arm extending to and sliding on the bar 92 which thus acts as a guide for the automatic chucking slide.

Projecting from the slide 98 is a boss carrying a roll 100 actuated by a cam on the cam drum 90 and is so placed that as the spindle carrier indexes, the shoe 102 will project into the groove in the spool 97 and as the slide 98 moves longitudinally along the bar 91, it removes the spool from beneath the fingers of the finger holders thus allowing the collet to be released.

In the rear of the chuck operating slides is the stock feed slide 103. This also slides on the bar 91 and has a projecting arm 104 to the bar 92. The slide 103 has securely fastened to it a ring 105 which encircles the stock feeding tubes 106. On the rear of the stock feeding tubes is the stock feeding spool 107. This ring lies directly in front of the enlarged portion of the spool 107. At the fourth position only, a plate or shoe 108, see Fig. 20, lies directly behind the enlarged portion of the spool.

Projecting downward from the slide 103 is a boss carrying a roll 109' for contact with the cam drum 90. Directly after the slide 98 has withdrawn, the spool 97 from underneath the fingers of the finger holder slide 103, through the operation of a suitable spring 111, the spool on the rear of the stockfeed tube is forced ahead by the shoe 108 coming in contact with the spool 107 and the stock is fed through the spindle and the chuck to the stock stop 64. Through the cams on the drum 90, the slide 98 forces through the shoe 102 the spool 97 under the fingers causing the collet to be drawn back and the stock to be chucked, after which the slide 103 moves rearwardly carrying the stock feed spool. The stock feeding tube draws back over the stock through the feed ring 105 in contact with the spool 107.

From the foregoing, it will be observed that, in this improved machine, the cam drum for operating the tool slide and the mechanism for operating the cam shaft carrying this drum, as well as the gear mechanism for driving the spindles and end working tools are all located within the gear box housing and are thus completely enclosed and protected from dirt and chips while the work spindle carrier and its driving mechanism are located within the opposite housing and are also protected from dirt and chips, these two housings being connected by a triangular beam forming an oil chamber and carrying the top slides and also the threading mechanism which may be located on one or both sides thereof as the occasion requires, while the bottom cross slides are carried by an extension of the work spindle housing and are directly driven by cams located within such housing and that all the operating mechanisms are driven from a motor at one end of the machine directly connected with the main driving shaft, thus forming a very compact machine with the operating and gear driving mechanisms completely enclosed and protected while, at the same time, a clear space is provided under the main tool slide for the passage of chips to the pan, the construction of the machine being such that it may be readily used for either four, five or six spindles without the necessity of redesigning the same, thus providing an interchangeable machine of large capacity.

It is to be understood that by describing in detail herein any particular form, structure or arrangement, it is not intended to limit the invention beyond the terms of the several claims or the requirements of the prior art.

Having thus explained the nature of our said invention and described a way of constructing and using the same, although without attempting to set forth all of the forms in which it may be made, or all of the modes of its use, we claim:

1. In a multiple spindle machine, the combination of a bed, a pair of upright housings carried thereby, a tool supporting beam connecting the tops of said housings and adapted to carry end working tools, an end working tool carried thereby, a main tool slide located below said beam, means extending from one housing to the other for supporting said slide, one of said housings constructed to receive a cam drum for operating said slide and the gear train for operating various parts of the machine, and the other of said housings constructed to receive interchangeably work spindle carriers having different sets of spindles and its operating mechanism, and interchangeable means for indexing any of said spindle carriers.

2. In a multiple spindle machine, the combination of a bed, a pair of upright housings carried thereby, a tool supporting beam connecting the tops of said housings and adapted to carry end working tools, a main tool slide located below said beam, means extending from one housing to the other for supporting said slide, one of said housings constructed to receive a cam drum for operating said slide and the gear train for operating various parts of the machine, and the other of said housings constructed to receive work spindle carriers having different sets of spindles and its operating mechanism, the work spindle housing constructed to carry a pair of cross slides, and means located therein for directly driving said slides.

3. In a multiple spindle machine, the combination of a bed, a pair of upright housings carried thereby, a tool supporting beam connecting the tops of said housings and adapted to carry end working tools, a main tool slide located below said beam, means extending from one housing to the other for supporting said slide, one of said housings constructed to receive a cam drum for operating said slide and the gear train for operating various parts of the machine, and the other of said housings constructed to receive work spindle carriers having different sets of spindles and its operating mechanism, the work spindle housing constructed to carry a pair of cross slides and means located therein for directly driving said slides, and a disappearing stock stop carried by said housing and means therein for operating said stop.

4. In a multiple spindle machine, the combination of a bed, a pair of upright housings carried thereby, a tool supporting beam connecting the tops of said housings and adapted to carry end working tools, a main tool slide located below said beam, means extending from one housing to the other for supporting said slide, one of said housings constructed to receive a cam drum for operating said slide and the gear train for operating various parts of the machine, and the other of said housings constructed to receive interchangeably work spindle carriers having different sets of spindles and its operating mechanism, interchangeable means for indexing any of said spindle carriers, and a motor secured at one end of the machine for directly driving the gear train.

5. In a multiple spindle machine, the combination of a bed, a pair of upright housings carried thereby, a tool supporting beam connecting the tops of said housings and adapted to carry end working tools, a main tool slide located below said beam, means extending from one housing to the other for supporting said slide, one of said housings constructed to receive a cam drum for operating said slide and the gear train for operating various parts of the machine, and the other of said housings constructed to receive work spindle carriers having different sets of spindles and its operating mechanism, a motor secured at one end of the machine for directly driving the gear train, said work spindle carrier housing having an extension, a pair of cross slides carried thereby, a disappearing work stop carried thereby, and transversely located cam drums carried within said extension for directly driving said cross slides, and means also located within the extension for operating said work stop.

6. In a multiple spindle machine, the combination of a bed, a pair of upright housings carried thereby, a tool supporting beam connecting the tops of said housings and adapted to carry end working tools, a main tool slide located below said beam, means extending from one housing to the other for supporting said slide, one of said housings constructed to receive a cam drum for operating said slide and the gear train for operating various parts of the machine, and the other of said housings constructed to receive work spindle carriers having different sets of spindles and its operating mechanism, a motor secured at one end of the machine for directly driving the gear train, said work spindle carrier housing having an extension, a pair of cross slides carried thereby, a disappearing work stop carried thereby, transversely located cam drums carried within said extension for directly driving said cross slides, a pair of top slides carried by said tool supporting beam, and means also operated from the cam drums within the work spindle housing extension for operating said top slides, and means also located within the extension for operating said work stop.

7. In a multiple spindle machine, the combination of a bed, a pair of upright housings carried thereby, a tool supporting beam connecting the tops of said housings, a main tool slide located below said beam, means extending from one housing to the other for supporting said slide, a work spindle carrier located in one of said housings, means also within said last housing for operating said work spindle carrier, a cam drum and gear trains located within and completely enclosed by the other of said housings for operating respectively the tool slide and other operating parts of the machine, and a motor for directly driving said gear train.

8. In a multiple spindle machine, the combination of a bed, a pair of upright housings carried thereby, a triangularly formed tool supporting beam connecting the tops of said housings, top slides carried on opposite sides of said beam, and working tools carried on one or both sides of said beam, a main tool slide located below said beam, a work spindle carrier and its operating mechanism located in one of said housings, and means for operating said main tool slide and the end working tools carried by said beam and located in the other of said housings.

9. In a multiple spindle machine, the combination of a bed, a pair of upright housings carried thereby, a triangularly formed tool supporting beam connecting the tops of said housings, top slides carried on opposite sides of said beam, end working tools carried on one or both sides of said beam, a main tool slide located below said beam, a work spindle carrier and its operating mechanism located in one of said housings, means for operating said main tool slide and the end working tools carried by said beam and located in the other of said housings, a pair of cross slides carried by an extension of the work spindle carrier housing, and means located therein for directly operating said slides.

10. In a multiple spindle machine, the combination of a bed, a pair of upright housings carried thereby, a triangularly formed tool supporting beam connecting the tops of said housings, top slides carried on opposite sides of said beam, end working tools carried on one or both sides of said beam, a main tool slide located below said beam, a work spindle carrier and its operating mechanism located in one of said housings, means for operating said main tool slide and the end working tools carried by said beam and located in the other of said housings, a pair of cross slides carried by an extension of the work spindle carrier housing, means located therein for directly operating said slides, a disappearing stock stop carried by said housing extension, and means located therein for operating the same.

11. In a multiple spindle machine, the combination of a bed, a pair of upright housings carried thereby, a triangularly formed tool supporting beam connecting the tops of said housings, top slides carried on opposite sides of said beam, end working tools carried on one or both sides of said beam, a main tool slide located below said beam, a work spindle carrier and its operating mechanism located in one of said housings, means for operating said main tool slide and the end working tools carried by said beam and located in the other of said housings, a pair of cross slides carried by an extension of the work spindle carrier housing, means located therein for directly operating said slides, a disappearing stock stop carried by said housing extension, means located therein for operating the same, and a motor located at one end of one housing for directly driving the mechanism located within said housing.

12. In a multiple spindle machine, the combination of a bed, a pair of upright housings secured thereto, a tool supporting beam connecting the tops of said housings, substantially vertically supported end working tools carried by one or both side faces of said beam, a slide supporting said end working tool, a bracket rigidly secured to the side face of the beam and having all along its side face a longitudinally extending way for supporting the slide and its tool adjacent to the work, and means for operating said end working tools.

13. In a multiple spindle machine, the combination of a bed, a pair of upright housings, a tool supporting beam connecting the tops of said housings, a pair of top slides carried by said beam, substantially vertically supported end working tools carried at one or both side faces of said beam, a slide supporting said end working tool, a bracket rigidly secured to the side face of the beam and having all along its side face a longitudinally extending way for supporting the slide and its tool adjacent to the work, and means for operating said end working tools.

14. In a multiple spindle machine, the combination of a bed, a pair of upright housings secured thereto, a tool supporting beam connecting the tops of said housings and having an oil chamber therein, end working tools carried by said beam, and means for operating said end working tools.

15. In a multiple spindle machine, the combination of a bed, a pair of upright housings, a tool supporting beam connecting the tops of said housings, substantially vertically supported threading mechanism carried by said beam at one or both side faces thereof, a slide supporting said threading mechanism, a bracket rigidly secured to the side face of the beam and having all along its side face a longitudinally extending way for supporting the slide and its threading tool adjacent to the work, means for operating said threading mechanisms, a top cross slide also carried by said beam, and means for operating it.

16. In a multiple spindle machine, the combination of a bed, a pair of upright housings secured thereto, a tool supporting beam connecting the tops of said housings, a pair of top slides secured to said beam, end working tools secured to one or both sides of said beam, a main tool slide located below said beam, a work spindle carrier and its operating mechanism located within one of said housings, said carrier having an extension projecting into the other housing and supporting said main tool slide, a cam drum located within the other housing for operating said main tool slide, a gear train located within said last housing for operating said end working tools, and a motor directly connected with said gear train.

17. In a multiple spindle machine, the combination of a bed, a pair of upright housings secured thereto, a tool supporting beam connecting the tops of said housings, a pair of top slides secured to said beam, end working tools secured to one or both sides of said beam, a main tool slide located below said beam, a work spindle carrier and its operating mechanism located within one of said housings, said carrier having an extension projecting into the other housing and supporting said main tool slide, a cam drum located within the other housing for operating said main tool slide, a gear train located within said last housing for operating said end working tools, a motor directly connected with said gear train, said work spindle carrier housing having an extension, a pair of cross slides carried by said extension, a transverse shaft located within said extension, and cam drums carried thereby for directly operating said last cross slides.

18. In a multiple spindle machine, the combination of a bed, a pair of upright housings secured thereto, a tool supporting beam connecting the tops of said housings, a pair of top slides secured to said beam, end working tools secured to one or both sides of said beam, a main tool slide located below said beam, a work spindle carrier and its operating mechanism located within one of said housings, said carrier having an extension projecting into the other housing and supporting said main tool slide, a cam drum located within the other housing for operating said main tool slide, a gear train located within said last housing for operating said end working tools and a motor directly connected with said gear train, said work spindle carrier housing having an extension, a pair of cross slides carried by said extension, a transverse shaft located within said extension, cam drums carried thereby for directly operating said last cross slides, a disappearing stock stop carried by said extension, and means located within the extension for operating said stock stop.

19. In a multiple spindle machine, the combination of a bed, a pair of upright housings secured thereto, a tool supporting beam connecting the tops of said housings, a pair of top slides secured to said beam, end working tools secured to one or both sides of said beam, a main tool slide located below said beam, a work spindle carrier and its operating mechanism located within one of said housings, said carrier having an extension projecting into the other housing and supporting said main tool slide, a cam drum located within the other housing for operating said main tool slide, a gear train located within said last housing for operating said end working tools and a motor directly connected with said gear train, said work spindle carrier housing having an extension, a pair of cross slides carried by said extension, a transverse shaft located within said extension, cam drums carried thereby for directly operating said last cross slides, a disappearing stock stop carried by said extension, means located within the extension for operating said stock stop, a bracket carried by one of said housings, and means supported by said bracket and connected with the main tool slide for guiding the same.

20. In a multiple spindle machine, the combination of a bed, a pair of upright housings, a tool supporting beam connecting the tops of said housings, a main tool slide located below said beam, a work spindle carrier located within one of the housings, means located in the other housing for operating the main tool slide, a stock stop located between said housings, and means for reciprocating the stop thereby to lower it below the spindle whereby it is out of the way to permit free tooling operations.

21. In a multiple spindle machine, the combination of a bed, a pair of upright housings, a tool supporting beam connecting the tops of said housings, a main tool slide located below said beam and between said housings, a work spindle carrier and its operating mechanism located within one of said housings, means located within the other housing for operating said main tool slide, a drilling attachment secured to said main tool slide, and means located within said last housing for operating the drill of said attachment.

22. In a multiple spindle machine, the combination of a bed, a pair of upright housings secured to said bed, a tool supporting beam connecting the tops of said housings, substantially vertically supported slides carried at one or both side faces of said beam for supporting transversely operating and end working tools, a slide supporting said end working tool, a bracket rigidly secured to the side face of the beam and having all along its side face a longitudinally extending way for supporting the slide and its end working tool adjacent to the work, means for operating said slides, a main tool slide located below said beam and between said housings, means for operating said main tool slide, and a work spindle carrier and its operating means located within one housing.

23. In a multiple spindle machine, the combination of a bed, a pair of upright housings secured to said bed, a tool supporting beam connecting the tops of said housings, slides carried at one or both sides of said beam for supporting transversely operating and end working tools, means for operating said slides, a main tool slide located below said beam and between said housings, means for operating said main tool slide, a work spindle carrier and its operating means located within one housing, a high speed drilling attachment carried by said main tool slide, and means within one of said housings for operating the drill of said attachment.

24. In a multiple spindle machine, the combination of a bed, a pair of upright housings secured thereto, a tool slide supporting beam connecting the tops of said housings, a main tool slide located below said beam, a work spindle carrier and its operating mechanism located in one housing, rotary work spindles carried thereby, a work spindle driving shaft, a cam shaft, a cam drum carried thereby and located in the other housing for operating said main tool slide, a shaft extending into said last housing, a motor directly connected thereto, gearing for driving the work spindle shaft, gearing for driving the cam shaft at one speed during the feed of the tools carried by the main tool slide and gearing for increasing the speed of the cam shaft for a quick return of said tools, the said gearing located in said cam drum carrying housing and driven from the directly driven motor shaft.

25. In a multiple spindle machine, the combination of a bed, a pair of upright housings secured thereto, a tool supporting beam connecting the tops of said housings, a main tool slide located below said beam, means extending from one housing to the other for supporting said slide, a work spindle carrier located in one of said housings, means for locking the carrier, and means for indexing the carrier and including means for holding the locking means retracted until the carrier has been completely indexed.

26. In a multiple spindle machine, the combination of a bed, a pair of upright housings secured thereto, a tool supporting beam connecting the tops of said housings, a main tool slide located below said beam, means extending from one housing to the other for supporting said slide, a work spindle carrier located in one of said housings, means for locking the carrier, and means for indexing the carrier and including means for holding the locking means retracted until the carrier has been completely indexed and comprising a pair of gears, one carried by the carrier, and means for rotating the other gear and including a cam shaft and cams rotated by the cam shaft for retracting the locking means and holding it in its retracted position until the work spindle carrier has been completely indexed.

27. In a multiple spindle machine, the combination of a bed, a work spindle carrier supported thereon, a co-operating main tool slide, means for indexing the work spindle carrier and comprising a gear carried by the carrier and a gear co-operating therewith, said last gear having lugs, a cam shaft, a roll carrying arm carried thereby and co-operating with said lugs for rotating the gears, a locking bolt co-operating with the spindle carrier, a lever for operating said bolt in one direction, and means for operating it in the opposite direction, a cam mounted on the cam shaft for engaging the bolt lever and operating it, and a cam mounted on the cam shaft for engaging the bolt operating lever and holding the bolt in its retracted position until the work spindle has been completely indexed.

28. In a multiple spindle machine, the combination of a bed, a pair of upright housings carried thereby, one constructed to receive work spindle carriers having different multiples of spindles, a tool supporting beam connecting the tops of said housings, a main tool slide mounted below said beam, a work spindle carrier carried by one of said housings, and means for indexing said work spindle carrier and effective to operate any one of said carriers by the substitution of a single element of the indexing means.

29. In a multiple spindle machine, the combination of a bed, an upright housing carried thereby, a main tool slide, said housing constructed to receive work spindle carriers carrying different multiples of spindles, and indexing means for indexing the work spindle carrier, the said indexing means being operative regardless of the number of work spindles carried by the carrier by the substitution of a single element thereof, and locking mechanism for the work spindle carrier, means for operating it, and means for preventing the operation of the locking mechanism until the carrier has been completely indexed.

30. In a multiple spindle machine, the combination of a bed, an upright housing carried thereby, a main tool slide, said housing constructed to receive work spindle carriers carrying different multiple of spindles, indexing means for indexing the work spindle carrier and comprising a pair of gears, one carried by the work spindle carrier, a cam shaft, means operated thereby for rotating the other of said gears, the same indexing means being operative regardless of the number of work spindles carried by the carrier by the substitution of one gear, and locking mechanism for the work spindle carrier, means for operating it, and means for preventing the operation of the locking mechanism until the carrier has been completely indexed.

31. In a multiple spindle machine, the combination of a bed, a housing carried thereby and constructed to receive work spindle carriers having different multiples of spindles, a work spindle carrier mounted within the housing, a main tool slide, means for operating it, and means for indexing said work spindle carrier and effective to operate any one of said carriers by the substitution of a single element of the indexing means.

32. In a multiple spindle machine, the combination of a bed, a housing carried thereby and constructed to receive work spindle carriers having different multiples of spindles, a work spindle carrier mounted within the housing, a main tool slide, means for operating it, and means for indexing said work spindle carrier and comprising a pair of gears, one carried by the work spindle carrier, a cam shaft, means operated thereby for rotating the other of said gears, the same indexing means being operative regardless of the number of work spindles carried by the carrier by the substitution of one gear.

33. In a multiple spindle machine, the combination of a bed, a spindle carrier housing, a main tool slide, means for operating it, a work spindle carrier within said housing, means for indexing it, a vertically reciprocating stock stop, and means for reciprocating the stop thereby to lower it below the spindle to permit free tooling operations.

34. In a multiple spindle machine, the combination of a bed, a spindle carrier housing having an extension, a main tool slide, means for operating it, a work spindle carrier within said housing, means for indexing it, a vertically reciprocating stock stop carried by said extension, and means for reciprocating the stop thereby to lower it below the spindle to permit free tooling operations.

35. In a multiple spindle machine, the combination of a bed, a spindle carrier housing mounted thereon, a main tool slide, means for operating it, a work spindle carrier within said housing, means for indexing it, a stock stop located in front of said housing, and means for reciprocating the stop thereby to lower it below the spindle to permit free tooling operations.

36. In a multiple spindle machine, the combination of a bed, a pair of upright housings secured thereto, a cored out tool supporting beam connecting the tops of said housings and having an inclined side, a main tool slide located below said beam, a cross slide supported on the inclined side of said top beam, and means for operating said slide, a part thereof being located within the cored out portion of the beam.

37. In a multiple spindle machine, the combination of a bed, a pair of upright housings secured thereto, a cored out tool supporting beam connecting the tops of said housings and having an inclined side, a main tool slide located below said beam, a cross slide supported on the inclined side of said top beam, and means for operating said slide, a part thereof being located within the cored out portion of the beam and comprising a pivoted segment and rack.

38. In a multiple spindle machine, the combination of a bed, a pair of upright housings secured thereto, a cored out tool supporting beam connecting the tops of said housings, a main tool slide located below said beam, a top cross slide mechanism carried by said beam, means securing said top cross slide to said beam and effective to permit the angular adjustment of said slide relative to the beam, and means located within said cored portion of the beam for shifting said slide.

39. In a multiple spindle machine, the combination of a bed, a pair of upright housings secured thereto, a cored out tool supporting beam connecting the tops of said housings, a main tool slide located below said beam, a top cross slide mechanism carried by said beam, means securing said top cross slide to said beam and effective to permit the angular adjustment of said slide relative to the beam, and means for operating said slide, a part thereof located within the cored out portion of the beam.

40. In a multiple spindle machine, the combination of a bed, a pair of upright housings secured thereto, a tool supporting beam connecting the tops of said housings, substantially vertically supported, threading mechanism carried by the side face of said beam, and means for securing the threading mechanism to the beam and effective to permit the angular adjustment thereof relative to the beam.

41. In a multiple spindle machine, the combination of a bed, a pair of upright housings secured thereto, a tool supporting beam supporting the tops of said housings, a main tool slide located below said beam, a top cross slide carried by said beam for angular adjustment relative thereto, and threading mechanism also carried by said beam and also supported for angular adjustment relative thereto.

42. In a multiple spindle machine, the combination of a bed, a pair of upright housings secured thereto, a cored out tool supporting beam supporting the tops of said housings, a main tool slide located below said beam, a top cross slide carried by said beam for angular adjustment relative thereto, threading mechanism also carried by said beam and also supported for angular adjustment relative thereto, and means for operating said top cross slide, a part thereof being located within the cored out portion of the beam.

43. In a multiple spindle machine, the combination of a bed, a pair of upright housings secured thereto, a tool supporting beam connecting the tops of said housings, a main tool slide located below said beam, an indexible work spindle carrier also located below said beam, a cross slide supported on said beam, a lever for operating said slide, means for operating said lever, and a tool supported by said lever and in position to co-operate with the work carried by successive spindles of the work spindle carrier as they are successively indexed into position.

44. In a multiple spindle machine, the combination of a bed, a pair of upright housings secured thereto, a tool supporting beam connecting the tops of said housings and having an inclined side, a main tool slide located below said beam, an indexible work spindle carrier having a series of six rotary spindles carried thereby, a cross slide supported on the inclined side of said beam, a lever for operating said slide, means for operating said lever, and a tool supported by said lever and in position to co-operate with the work carried by the rotary spindles of the indexible work spindle carrier as they are successively indexed into position.

45. In a multiple spindle machine, the combination of a bed, a pair of upright housings carried thereby, a tool supporting beam connecting the tops of said housings, a plurality of tool slides carried at one or both sides of said beam for the support of both cross and end working tools, a main tool slide located below said beam, means extending from one housing to the other for supporting said main tool slide, one of said housings constructed to receive a cam drum for operating said main tool slide and the gear train for operating various parts of the machine and the other of said housings constructed to receive work spindle carriers having different sets of spindles and its operating mechanism, a cam shaft on which said cam drum is mounted and located below said tool slide and interchangeable means carried by said cam shaft for indexing said spindle carriers.

46. In a multiple spindle machine, the combination of a bed, a pair of upright housings carried thereby, a tool supporting beam connecting the tops of said housings, a plurality of tool slides carried at one or both sides of said beam for the support of both cross and end working tools, a main tool slide located below said beam, means extending from one housing to the other for supporting said main tool slide, one of said housings constructed to receive a cam drum for operating said main tool slide and the gear train for operating various parts of the machine and the other of said housings constructed to receive work spindle carriers having different sets of spindles and its operating mechanism, a cam shaft on which said cam drum is mounted and located below said tool slide, and a sleeve enclosing said cam shaft and rigidly connecting said housings.

47. In a multiple spindle machine, the combination of a bed, a pair of upright housings carried thereby, a beam connecting the tops of said housings, a main tool slide located below said beam, means extending from one housing to the other for supporting said main tool slide, a cam drum for operating said main tool slide, a cam shaft on which said cam drum is mounted and located below said main tool slide, and a sleeve enclosing said cam shaft and rigidly connecting said housings.

48. In a multiple spindle machine, the combination of a bed, a pair of upright housings carried thereby, a tool supporting beam connecting the tops of said housings, a plurality of differently positioned tool slides carried at one or both side faces of said beam for supporting both cross and end working tools, a bracket rigidly secured to the side face of the beam and having all along its side face a longitudinally extending way for supporting the end working tool slide and its tool adjacent to the work, and means for operating said tools.

49. In a multiple spindle machine, the combination of a bed, a pair of upright housings carried thereby, a tool supporting beam connecting the tops of said housings, a plurality of differently positioned tool slides secured for angular adjustment at one or both sides of said beam for supporting both cross and end working tools, and means for operating said tools.

50. In a multiple spindle machine, the combination of a bed, a pair of upright housings carried thereby, a tool supporting beam connecting the tops of said housings, one or more cross tool slides bolted to said beam for angular adjustment, means for operating said slides, one or more end working tool slides bolted to said beam for angular adjustment, and means for operating said slides.

51. In a multiple spindle machine, the combination of a bed, a pair of upright housings carried thereby, a main tool slide supported on said bed, means extending from one housing to the other for supporting said slide, a cam shaft below said tool slide, means carried thereby for operating said tool slide, one of said housings constructed to receive interchangeably indexible turrets having different sets of spindles without the rebuilding of the machine, and interchangeable means for indexing any of said turrets.

52. In a multiple spindle machine, the combination of a bed, a pair of upright housings carried thereby, a main tool slide supported on said bed, means extending from one housing to the other for supporting said slide, a cam shaft below said tool slide, means carried thereby for operating said tool slide, one of said housings constructed to receive interchangeably indexible turrets having different sets of spindles without the rebuilding of the machine, interchangeable means for indexing any of said turrets, and a sleeve enclosing said cam shaft and connected to said housings.

53. In a multiple spindle machine, the combination of a bed, a pair of upright housings carried thereby, a main tool slide supported on said bed, means extending from one housing to the other for supporting said slide, a cam shaft below said tool slide, means carried thereby for operating said tool slide, one of said housings constructed to receive interchangeably indexible turrets having different sets of spindles without the rebuilding of the machine, interchangeable means for indexing any of said turrets, a sleeve enclosing said cam shaft and connected to said housings, and a tool supporting beam connecting the tops of said housings.

54. In a multiple spindle machine, the combination of a bed, a main tool slide, means for operating it, a work spindle carrier, means for indexing it, a cam shaft supported on the bed, a reciprocating stock stop, a plunger for reciprocating it, a lever for operating said plunger, and cams on said cam shaft for shifting said lever in opposite directions thereby to reciprocate the plunger and thereby the stock stop into and out of operative position.

55. In a multiple spindle machine, the combination of a bed, a pair of upright housings carried thereby, one of said housings having an extension, a main tool slide supported between said housings, a cam shaft located below said main tool slide, a reciprocating stock stop, a plunger located within said housing extension, an oscillating lever within said extension, cams on the cam shaft and located within said extension and in position to engage said oscillating lever thereby to reciprocate the plunger and thereby the stock stop into and out of operative position.

56. In a multiple spindle machine, the combination of a bed, upright housings carried thereby, a beam connecting the tops of said housings, a main tool slide supported between said housings and below said beam, an indexible work spindle carrier supported by one of said housings, a cam shaft located below said main tool slide, means for indexing said work spindle carrier and comprising a gear carried thereby, an interchangeable gear in mesh therewith and means for resetting said gear to enable it to mesh with the indexible carrier gear whereby, by the mere substitution of gears, either a four, five or six spindle indexible work spindle carrier may be indexed without the rebuilding of the machine, radially located lugs carried by said last gear, and means on said cam shaft for engaging said lugs thereby to rotate the gears and index the carrier.

57. In a multiple spindle machine, the combination of a bed, upright supports carried thereby, a main tool slide supported between said supports, an indexible work spindle carrier supported by one of said supports, a cam shaft located below said main tool slide, means for indexing said work spindle carrier and comprising a gear carried thereby, an interchangeable gear in mesh therewith and means for resetting said gear to enable it to mesh with the indexible carrier gear whereby, by the mere substitution of gears, either a four, five or six spindle indexible work spindle carrier may be indexed without the rebuilding of the machine, and means operated by the cam shaft for rotating the gears thereby to index the carrier.

58. In a multiple spindle machine, the combination of a bed, a pair of upright supports carried thereby, a main tool slide located between said supports, a cam shaft located below said tool slide, means thereon for reciprocating the tool slide, an indexible work spindle carrier, one of said supports constructed for the reception of work spindle carriers having different sets of spindles without the rebuilding of the machine, and means operative from the cam shaft for indexing said carrier and including a replaceable element whereby either a four, five or six work spindle carrier may be indexed without the rebuilding of the machine.

59. In a multiple spindle machine, the combination of a bed, a pair of upright supports carried thereby, a main tool slide located between said supports, a cam shaft located below said tool slide, means thereon for reciprocating the tool slide, an indexible work spindle carrier, one of said supports constructed for the reception of work spindle carriers having different sets of spindles without the rebuilding of the machine, and means operative from the cam shaft for indexing said carrier and including a replaceable element whereby either a four, five or six work spindle carrier may be indexed without the rebuilding of the machine and comprising a gear carried by the indexible work spindle carrier, said replaceable element comprising a gear in mesh with said carrier gear and means for adjusting the position of said replaceable gear.

60. In a multiple spindle machine, the combination of a bed, a pair of upright supports carried thereby, a main tool slide located between said supports, a cam shaft located below said tool slide, means thereon for reciprocating the tool slide, an indexible work spindle carrier, one of said supports constructed for the reception of work spindle carriers having different sets of spindles without the rebuilding of the machine, means operative from the cam shaft for indexing said carrier and including a replaceable element whereby either a four, five or six work spindle carrier may be indexed without the rebuilding of the machine, and means for locking the work spindle carrier and comprising a spring-pressed reciprocating bolt, a lever for reciprocating said bolt, and cam means on said cam shaft for operating said lever and also effective to cooperate with said lever for holding said bolt in its retracted position during the indexing of the carrier.

61. In a multiple spindle machine, the combination of a bed, a pair of upright housings carried thereby, a beam connecting the tops of said housings, an indexible work spindle carrier carried by one of said housings, a main tool slide located below said beam and between said housings, a cam shaft located below said main tool slide, a cam drum within the other of said housings, an arm connected with the tool slide, a bracket in front of the cam drum housing for guiding said arm, a bar connected to the arm, means carried by the bar and in position to cooperate with the cam drum for reciprocating the main tool slide, a side projecting arm carried by the arm, and a shaft co-operating therewith for maintaining the reciprocating means of the tool slide in position.

62. In a multiple spindle machine, the combination of a bed, a pair of upright housings carried thereby, a beam connecting the tops of said housings, an indexible work spindle carrier carried by one of said housings, a main tool slide located below said beam and between said housings, a cam shaft located below said main tool slide, a cam drum within the other of said housings, an arm connected with the tool slide, a bracket in front of the cam drum housing for guiding said arm, a bar connected to the arm, means carried by the bar and in position to cooperate with the cam drum for reciprocating the main tool slide, a side projecting arm carried by the arm, a shaft co-operating therewith for maintaining the reciprocating means of the tool slide in position, and means carried by the arm for stopping the forward movement of the tool slide.

63. In a multiple spindle machine, the combination of a bed, a pair of upright housings secured to said bed, a tool supporting beam connecting the tops of said housings, a main tool slide located below said beam and between said housings, means for reciprocating said tool slide, a work spindle carrier located within one of said housings, means for indexing said carrier, rotatable work spindles carried by said carrier, a driving shaft for rotating said spindles, drilling means secured to said main tool slide, and means operative from the work spindle driving shaft for rotating said drilling means and including means for changing the speed of the drill.

64. In a multiple spindle machine, the combination of a bed, a pair of upright housings secured to said bed, a tool supporting beam connecting the tops of said housings, a main tool slide located below said beam and between said housings, means for reciprocating said tool slide, a work spindle carrier located within one of said housings, means for indexing said carrier, rotatable work spindles carried by said carrier, a driving shaft for rotating said spindles, drilling means secured to said main tool slide, and means operative from the work spindle driving shaft for rotating said drill and including a gear carried by said shaft adapted to mesh with and drive a plurality of high speed drilling means when applied to said tool slide for reciprocation therewith.

65. In a multiple spindle machine, the combination of a bed, a pair of upright housings secured thereto, a tool supporting beam connecting the tops of said housings, a main tool slide located below said beam, a cam shaft below said tool slide, means operated thereby for reciprocating said tool slide, an indexible work spindle carrier mounted in one of said housings, means operated by the cam shaft for indexing it, a plurality of work spindles carried by said carrier, a driving shaft for rotating said spindles, a supporting bracket carried by said top beam, a slide mounted on said bracket, a threading die spindle carried by said slide, means operated by the cam shaft for shifting the die slide on its bracket, and means operated from the rotary spindle driving shaft for rotating said threading die spindle.

66. In a multiple spindle machine, the combination of a bed, a pair of upright housings secured thereto, a tool supporting beam connecting the tops of said housings, a main tool slide located below said beam, a cam shaft below said tool slide, means operated thereby for reciprocating said tool slide, an indexible work spindle carrier mounted in one of said housings, means operated by the cam shaft for indexing it, a plurality of work spindles carried by said carrier, a driving shaft for rotating said spindles, a supporting bracket carried by said top beam, a slide mounted on said bracket, a threading die spindle carried by said slide, means operated by the cam shaft for shifting the die slide on its bracket, and means operated from the rotary spindle driving shaft for rotating said threading die spindle, said last means including means for giving different threading speeds to the threading die spindle.

67. In a multiple spindle machine, the combination of a bed, a pair of upright housings secured thereto, a tool supporting beam connecting the tops of said housings, a main tool slide located below said beam, a cam shaft below said tool slide, means operated thereby for reciprocating said tool slide, an indexible work spindle carrier mounted in one of said housings, means operated by the came shaft for indexing it, a plurality of work spindles carried by said carrier, a driving shaft for rotating said spindles, a supporting bracket carried by said top beam, a slide mounted on said bracket, a threading die spindle carried by said slide, means operated by the cam shaft for shifting the die slide on its bracket, means operated from the rotary spindle driving shaft for rotating said threading die spindle, and means operated by the work spindle driving shaft for rotating the threading die spindle at a greater speed than said rotary spindle driving shaft.

68. In a multiple spindle machine, the combination of a bed, a pair of upright housings secured thereto, a tool supporting beam connecting the tops of said housings, a main tool slide located below said beam, a cam shaft below said tool slide, means operated thereby for reciprocating said tool slide, an indexible work spindle carrier mounted in one of said housings, means operated by the cam shaft for indexing it, a plurality of work spindles carried by said carrier, a driving shaft for rotating said spindles, a supporting bracket carried by said top beam, a slide mounted on said bracket, a threading die spindle carried by said slide, means operated by the cam shaft for shifting the die slide on its bracket, means operated from the rotary spindle driving shaft for rotating said threading die spindle, a threading die operating clutch, and means operated by the cam shaft for controlling the operation of said clutch.

69. In a multiple spindle machine, the combination of a bed, a pair of upright housings carried by the bed, a tool supporting beam connecting the tops of said housings, a main tool slide supported between the housings and below said top beam, a cam drum located in one of said housings, means operated thereby for reciprocating the slide, an indexible work spindle carrier located in the other housing, means operated from the cam shaft for indexing said carrier, a plurality of rotatable work spindles carried by said carrier, a driving shaft for rotating said spindles, a hand operated chucking slide supported in the rear of said last housing, an automatically operated chucking slide also supported in the rear of said last housing and operated from said cam shaft, and an automatically operated stock feed slide also supported in the rear of said last housing and operated from the cam shaft.

70. In a multiple spindle screw machine, the combination of a bed, a pair of upright housings supported by said bed, a tool supporting beam connecting the tops of said housings, a main tool slide located below said beam, an indexible work spindle carrier mounted in one of said housings, rotatable work spindles carried thereby, a cam shaft located below said main tool slide, a cam drum in the other of said housings for reciprocating said main tool slide, means operated by said cam shaft for indexing the carrier, a plurality of cross and top slides located in position to engage the work carried by the work spindles of the indexible work spindle carrier, and driving mechanism for the cam shaft and other instrumentalities and comprising a main power shaft, a motor carried thereby, a rotary work spindle driving shaft, gearing between said shaft and motor shaft for rotating the spindle shaft and including interchangeable gears and a high speed gear, a series of three gear connected cross shafts, means for operating one of them from the spindle driving shaft, means for operating the cam shaft from one of the cross shafts, interchangeable gearing between two of said cross shafts for imparting faster or slower speeds to the cam shaft, means connecting the main power shaft with one of said cross shafts for returning the main tool slide at a faster speed, a fourth transverse shaft, means between said transverse shaft and the cam shaft for operating the former, cam drums on said fourth transverse shaft, and means operated by the cam drums for operating the cross slides.

71. The structure of claim 70 in which the indexible work spindle carrier is interchangeable and in which the means for indexing said carrier from the cam shaft is also interchangeable.

72. The structure of claim 70 having a high speed drilling attachment comprising a sliding drill spindle mounted on the main tool slide and means between said drill spindle and the rotary work spindle driving shaft for rotating the drill spindle.

73. The structure of claim 70 having threading mechanism carried by the top beam, means on the cam shaft for sliding said threading mechanism and means for rotating the threading mechanism from the work spindle driving shaft.

74. The structure of claim 70 in which the indexible work spindle carrier is interchangeable and the means for operating said carrier from the cam shaft is also interchangeable, and having a high speed drilling attachment comprising a sliding drill spindle mounted on the main tool slide and means between said drill spindle and the rotary work spindle driving shaft for rotating the drill spindle, and also having threading mechanism carried by the top beam, means on the cam shaft for sliding said threading mechanism, and means for rotating the threading mechanism from the work spindle driving shaft.

75. In a multiple spindle machine, the combination of a standard supporting frame, a cam shaft, an indexible work spindle carrier having a series of rotating work spindles, a main tool slide adapted to support a series of tools co-operating with the series of rotating work spindles, an indexible work spindle carrier having a larger number of rotating work spindles, a main tool slide adapted to carry a series of tools co-operating with the larger series of rotating work spindles for performing an increased amount of work, means for interchangeably supporting either of said indexible work spindle carriers and its co-operating main tool slide on said standard supporting frame without the rebuilding of the machines, and means operative from the cam shaft for indexing the work spindle carrier and reciprocating said tool slide.

76. In a multiple spindle machine, the combination of a standard supporting frame, a cam shaft, an indexible work spindle carrier having a series of rotating work spindles, a main tool slide adapted to support a series of tools co-operating with the series of rotating work spindles, an indexible work spindle carrier having a larger number of rotating work spindles, a main tool slide adapted to carry a series of tools co-operating with the larger series of rotating work spindles for performing an increased amount of work, means for interchangeably supporting either of said indexible work spindle carriers and its co-operating main tool slide on said standard supporting frame without the rebuilding of the machine, and means operative from the cam shaft for indexing the work spindle carrier and reciprocating said tool slide and including interchangeable means.

77. In a multiple spindle machine, the combination of a standard supporting frame, a cam shaft, interchangeable work spindle carriers having different sets of rotating work spindles, a main tool slide, means operative from the cam shaft for indexing the work spindle carrier and reciprocating said tool slide and including an interchanegable gear having four lugs corresponding to the lesser number of rotating work spindles whereby the rotation of said four lugs will index either a four, five or six spindle work spindle carrier.

78. In a multiple spindle machine, the combination of a standard supporting frame including a housing adapted to interchangeably receive work spindle carriers having different sets of spindles, a main tool slide, means for reciprocating said slide, and means for indexing the work spindle carrier and including interchangeable means adapted when interchanged to operate a different spindle carrier.

79. In a multiple spindle machine, the combination of a standard supporting frame including a housing adapted to interchangeably receive work spindle carriers having different sets of spindles, a main tool slide, means for reciprocating said slide, and means for indexing the work spindle carrier and including resettable means adapted when reset to operate a different spindle carrier.

80. In a multiple spindle machine, the combination of a standard supporting frame including a housing adapted to interchangeably receive work spindle carriers having different sets of spindles, a main tool slide, means for reciprocating said slide, and means for indexing the work spindle carrier and including interchangeable means and a resettable means adapted when interchanged and reset to operate a different spindle carrier.

81. In a multiple spindle machine, the combination of a standard supporting frame including a housing adapted to interchangeably receive work spindle carriers having different sets of spindles, a main tool slide, means for reciprocating said slide, means for indexing the work spindle carrier and changeable to suit the various spindle carriers, a locking bolt for the work spindle carrier, said bolt being carried by and angularly located relative to said housing whereby the interchangeability of the work spindle carriers may be effected without changing the positions of the spindles, the locking bolt or its seat in the carrier, and means for operating said bolt to permit the indexing of the carrier.

82. In a multiple spindle machine, the combination of a standard supporting frame including a housing adapted to interchangeably receive work spindle carriers having different sets of spindles, a main tool slide, means for reciprocating said slide, means for indexing the work spindle carrier and including interchangeable means and a resettable means changeable to suit the various spindle carriers, a locking bolt for the work spindle carrier, said bolt being carried by and angularly located relative to said housing whereby the interchangeability of the work spindle carriers may be effected without changing the positions of the spindles, the locking bolt or its seat in the carrier, and means for operating said bolt to permit the indexing of the carrier.

83. In a multiple spindle machine, the combination of a bed, a pair of upright housings carried thereby, one constructed to receive work spindle carriers having different multiples of spindles, a tool supporting beam connecting the tops of said housings, a main tool slide mounted below said beam, a work spindle carrier carried by one of said housings, changeable means for indexing said work spindle carrier and effective to operate any one of said carriers by the substitution of a single element of the indexing means, a locking bolt for the work spindle carrier carried by and angularly located relative to the work spindle housing whereby the interchangeability of the spindle carriers may be effected without changing the positions of the spindles, locking bolt, or its seat in the carrier, and means for operating said bolt to permit the indexing of the carrier.

84. In a multiple spindle machine, the combination of a bed, a pair of upright housings secured to said bed, a work spindle carrier and its operating means located within one of the housings, a tool supporting beam connecting the tops of said housings, longitudinally movable substantially vertically supported slides carried at one or both side faces of said beam for supporting tool spindles or holders adjacent to the work, a bracket rigidly secured to the side face of the beam and having all along its side face a longitudinally extending way for supporting the slide and its tool adjacent to the work, means for operating each slide back and forth longitudinally relative to said beam whereby the tool will follow on to the work without increasing the overhang thereof relative to its point of support, a main tool slide located below said beam and between said housings, and means for operating said main tool slide.

85. In a machine of the class described, the combination of a bed, a pair of upright housings carried thereby, a tool supporting beam connecting the top of said housings, a main tool slide located below said beam, a horizontally movable substantially vertically supported slide in position to support a tool spindle or holder adjacent to the work, a bracket rigidly secured to the side face of the beam and having all along its side face a longitudinally extending way for supporting said slide adjacent to the work, and means for shifting said slide back and forth on said bracket whereby the tool will follow on to the work without increase of the overhang thereof relative to its point of support.

86. In a turret lathe, a machine bed supporting a gear casing, a spindle drum casing spaced from the gear casing, a spindle drum in the spindle drum casing and having an axial extension mounted in said gear casing, a beam independent of and extending above said bed and connecting the upper parts of said casings, a longitudinally movable main tool slide axially carried by said axial extension and entirely independent of and having no direct connection with said beam, a substantially vertically supported longitudinally movable auxiliary tool slide supported on said beam and adapted to carry a tool spindle or holder shiftable therewith, a bracket rigidly secured to the side face of the beam and having all along its side face a longitudinally extending way for supporting said auxiliary slide and its tool adjacent to the work, means rigidly secured to the side face of said beam for supporting said auxiliary slide adjacent to the work whereby the tool will follow on to the work without increasing the overhang thereof relative to its point of support, and independent feeding means for each of said tool slides.

87. In a turret lathe, in combination, a spindle drum casing, a spindle drum mounted therein, a gear casing spaced from the spindle drum and its casing, spaced connections independent of each other between the gear casing and the spindle drum casing, a longitudinally movable main tool slide axially carried by one of said connections and entirely independent of and having no direct connection with the other spaced connection, a substantially vertically supported longitudinally movable auxiliary tool slide supported on the other connection and adapted to carry a tool spindle or holder shiftable therewith, a bracket rigidly secured to the side face of the beam and having all along its side face a longitudinally extending way for supporting said auxiliary slide and its tool adjacent to the work, means rigidly secured to the side face of the connection for supporting said slide adjacent to the work whereby the tool will follow on to the work without increasing the overhang thereof relative to its point of connection, means for feeding the main tool slide, and separate means for feeding the auxiliary tool slide.

88. In a turret lathe, a machine bed supporting a gear casing and a spindle drum casing spaced from the gear casing, a spindle drum carrying rotary work spindles in the spindle drum casing and having an axial extension mounted in said gear casing, a beam independent of and extending above said bed and connecting the upper parts of said casings, a longitudinally movable main tool slide axially carried by said axial extension and entirely independent of and having no direct connection with said beam and adapted to carry tools co-operating with all of the work spindles of the spindle drum at the same time, a substantially vertically supported longitudinally movable auxiliary tool slide supported on the side face of said beam and adapted to carry a tool spindle or holder, a bracket rigidly secured to the side face of the beam and having all along its side face a longitudinally extending way for supporting said auxiliary slide and its tool adjacent to the work, independent feeding means for each of said tool slides and including cam means located below the main tool slide, one or more top or cross tool slides also mounted on said beam, and means for operating each of said cross slides.

89. In a turret lathe, in combination, a spindle drum casing, a spindle drum mounted therein and carrying rotary work spindles, a gear casing spaced from the spindle drum and its casing, spaced connections independent of each other between the gear casing and spindle drum casing, a longitudinally movable main tool slide axially carried by one of said connections and entirely independent of and having no direct connection with the other spaced connection and adapted to carry tools co-operating with all of the work spindles of the spindle drum at the same time, a substantially vertically supported longitudinally movable auxiliary tool slide supported on the side face of the other connection and adapted to carry a tool spindle or holder, a bracket rigidly secured to the side face of the beam and having all along its side face a longitudinally extending way for supporting said auxiliary slide and its tool adjacent to the work, means for feeding the main tool slide, and separate means for feeding the auxiliary tool slide and including means located below the main tool slide, one or more top or cross tool slides also supported by said beam, and means for operating each of said cross slides.

90. In a turret lathe, in combination, a spindle drum casing, a spindle drum mounted therein and carrying rotary work spindles, a gear casing spaced from the spindle drum and its casing, spaced connections independent of each other between the gear casing and spindle drum casing, a longitudinally movable main tool slide axially carried by one of said connections and entirely independent of and having no direct connection with the other spaced connection and adapted to carry tools co-operating with all of the work spindles of the spindle drum at the same time, a substantially vertically supported longitudinally movable auxiliary tool slide supported on the side face of the other connection and adapted to carry a tool spindle or holder, a bracket rigidly secured to the side face of the beam and having all along its side face a longitudinally extending way for supporting said auxiliary slide and its tool adjacent to the work, means for feeding the main tool slide, separate means for feeding the auxiliary tool slide, one or more top or cross tool slides also supported by said beam, means for operating each of said cross slides, and means located below said axially movable main tool slide for guiding it.

91. The machine of claim 90 in which the feeding means for shifting the main tool slide is connected with said guiding means.

92. The machine of claim 90 in which said guiding means is located between said axially movable main tool slide and the bed of the machine.

93. The machine of claim 90 in which said guiding means is located between said axially movable main tool slide and the bed of the machine and with which the feeding means for shifting said main tool slide is connected.

94. In a turret lathe, in combination, a spindle drum casing, a spindle drum mounted therein and carrying rotary work spindles, a gear casing spaced from the spindle drum and its casing, spaced connections independent of each other between the gear casing and spindle drum casing, one connecting the tops of said casings and the other therebelow, a longitudinally movable main tool slide axially carried by the lower of said connections and entirely independent of and having no direct connection with the other spaced connection thereabove and adapted to carry tools co-operating with all of the spindles of the spindle drum at the same time, a substantially vertically supported longitudinally movable auxiliary tool slide supported on one or both side faces of the upper connection and each adapted to carry a tool spindle or holder shiftable therewith, a bracket rigidly secured to the side face of the beam and having all along its side face a longitudinally extending way for supporting said auxiliary slide and its tool adjacent to the work, means rigidly secured to said upper connection for supporting said auxiliary slide adjacent to the work whereby the tool will follow on to the work without increasing the overhang thereof relative to its point of support, means for feeding the main tool slide, and separate means for feeding the auxiliary tool slide and including cam means located below the main tool slide, one or more top or cross tool slides also supported by the perpendicular sides of said upper connection, and means for operating each of said cross slides, all of the tools of the several slides adapted to co-operate in the completion of a piece of work.

95. The machine of claim 90 in which said guiding means is carried by an extension of one of the casings.

96. In a multiple spindle machine, the combination of a bed, a pair of upright housings carried thereby, a tool supporting beam connecting the tops of said housings, a main tool slide below said beam, means extending from one housing to the other for supporting said slide, mechanism located in one of said housings for operating various parts of the machine, a work spindle carrier located in the other housing, said work spindle carrier housing having an extension, a pair of cross slides carried by said extension, and transversely located cam drums carried within said extension for directly driving said cross slides.

97. In a multiple spindle machine, the combination of a bed, a pair of upright housings carried thereby, a tool supporting beam connecting the tops of said housings, a main tool slide below said beam, means extending from one housing to the other for supporting said slide, a cam drum adjacent to one of said housings for operating said slide, mechanism located in one of said housings for operating various parts of the machine, a work spindle carrier located in the other housing, said work spindle carrier housing having an extension, a pair of cross slides carried by said extension, and transversely located cam drums carried within said extension for directly driving said cross slides.

98. The machine of claim 96 in which a pair of top slides is carried by said tool supporting beam, and means also operated from the cam drums within the work spindle carrier housing extension for operating said top slides.

99. In an automatic multiple spindle machine, the combination of an indexible spindle carrier having a plurality of rotatable spindles, a main tool slide, means for reciprocating it, and means for indexing the carrier comprising a gear secured to the carrier and an independently supported gear in mesh therewith and having a plurality of guide-ways on its side face, a cam shaft, and a rotatable arm fixed to the cam shaft and rotatable therewith and having a working length less than the distance between the axis of the cam shaft and the axis of said last gear whereby strain at the starting and shock at the stopping during the indexing of the spindle carrier is avoided and the acceleration, rapid turning and deceleration of the carrier is obtained at the proper times during each indexing.

100. The machine of claim 99 in which the independently supported gear is located laterally of the vertical plane of the axis of the spindle carrier and the cam shaft is located to one side of said independently supported gear.

101. The machine of claim 99 in which the means for reciprocating the tool slide comprises a depending arm secured to the tool slide and guided on a rigid part of the machine, and means connected therewith and having means co-operating with the cam shaft, said parts having associated therewith a laterally extending sliding guide arm.

102. In a turret lathe, a machine frame comprising a gear casing or housing, a spindle drum casing or housing spaced from the gear casing, an indexible spindle drum or carrier in said spindle drum casing and carrying rotatable work spindles, an axial extension extending from the spindle drum casing to the gear casing, a reciprocating main tool slide axially supported on said axial extension and adapted to carry tools for the performance of certain operations on the work and adapted to co-operate with all of the work spindles of the spindle drum at the same time, a beam independent of and extending above said axial extension and connecting the upper parts of said gear and spindle drum casings and adapted to carry a longitudinally movable auxiliary tool for the completion of the operation on the work commenced by the tools of the main tool slide, means for operating said main tool slide and said auxiliary tool independently of each other, said main tool slide having no connection with the beam carrying the auxiliary tool whereby shock and vibration of the main tool slide will not be transmitted to the auxiliary tool on the beam, and means for intermittently indexing the spindle drum and comprising a gear carried by the drum, a cam shaft, an arm mounted on the cam shaft, and a gear meshing with the drum gear and intermediate said arm and drum gear and having guide-ways for the reception of said arm.

103. The machine of claim 102 in which said arm has a working length less than the distance between the axis of the cam shaft and the axis of the intermediate gear.

104. In a multiple spindle machine, the combination of a standard supporting frame including an indexible spindle carrier housing adapted to interchangeably receive work spindle carriers having different sets of rotating work spindles, a main tool slide, a cam shaft, means operative from the cam shaft for indexing the work spindle carrier and reciprocating said tool slide and including an intermediate gear between the cam shaft and work spindle carrier and having a pre-determined series of lugs or roller guide-ways corresponding to the number of one set of work spindles whereby the same number of guide-ways may be used with different diameter gears to rotate either a four, five or six spindle work spindle carrier.

CHARLIE W. SIMPSON.
ALFRED E. DRISSNER.